(12) United States Patent
Fukazawa et al.

(10) Patent No.: US 6,531,695 B2
(45) Date of Patent: *Mar. 11, 2003

(54) SCANNER CARTRIDGE AND INFORMATION PROCESSING APPARATUS

(75) Inventors: Hideo Fukazawa, Chigasaki (JP); Makoto Torigoe, Tokyo (JP); Shoji Kikuchi, Yokohama (JP); Shinya Asano, Tokyo (JP); Kiyoshi Kaneko, Yokohama (JP); Yuichi Kaneko, Koriyama (JP); Hiroyuki Tanaka, Kawasaki (JP); Akihiko Nakatani, Yokohama (JP); Minoru Ohkawara, Minano-machi (JP)

(73) Assignees: Canon Kabushiki Kaisha (JP); Canon Denshi Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,614

(22) Filed: Apr. 10, 1997

(65) Prior Publication Data

US 2001/0032927 A1 Oct. 25, 2001

(30) Foreign Application Priority Data

Apr. 18, 1996 (JP) .............................................. 8-096848

(51) Int. Cl.⁷ .................................................. H01J 5/02
(52) U.S. Cl. ..................... 250/239; 250/208.1; 358/509
(58) Field of Search ............................ 250/239, 208.1, 250/559.16, 559.18; 358/497, 474, 296, 505, 509, 510; 355/19, 84, 67; 347/2, 3, 108

(56) References Cited

U.S. PATENT DOCUMENTS

| | | | | | |
|---|---|---|---|---|---|
| 4,581,657 | A | * | 4/1986 | Takano | 358/285 |
| 4,683,501 | A | * | 7/1987 | Carena et al. | 358/293 |
| 5,121,309 | A | * | 6/1992 | Ewing et al. | 362/226 |
| 5,281,803 | A | * | 1/1994 | Ishizuka | 250/208.1 |
| 5,313,289 | A | * | 5/1994 | Nagane et al. | 358/475 |
| 5,682,253 | A | * | 10/1997 | Sakamoto et al. | 358/468 |
| 5,736,738 | A | * | 4/1998 | Movaghar | 250/239 |
| 5,737,095 | A | * | 4/1998 | Kikuchi et al. | 358/475 |
| 5,767,988 | A | * | 6/1998 | Dobbs et al. | 358/474 |
| 5,923,042 | A | * | 7/1999 | Mietta et al. | 250/559.06 |
| 5,936,740 | A | * | 8/1999 | Fukazawa et al. | 358/296 |

* cited by examiner

*Primary Examiner*—Que T. Le
*Assistant Examiner*—Thanh X. Luu
(74) *Attorney, Agent, or Firm*—Fitzpatrick, Cella, Harper & Scinto

(57) ABSTRACT

A scanner head cartridge is constituted by a lower case which houses optical parts required for reading and electrical parts required for image processing, and an upper case which can engage with the lower case to cover the open surface of the lower case, and a positioning guide means used upon inserting the cartridge into the carriage is formed on the surface of the upper case, that is opposite to the lower case. A scanner head cartridge is held on a carriage that moves an ink head cartridge of an ink-jet printer for performing recording on a recording medium, in place of the ink head cartridge, and can be commonly used using a common base unit even in carriages which mount different ink head cartridges and have different shapes. In addition, the scanner head cartridge allows easy adjustment of the optical system.

18 Claims, 20 Drawing Sheets

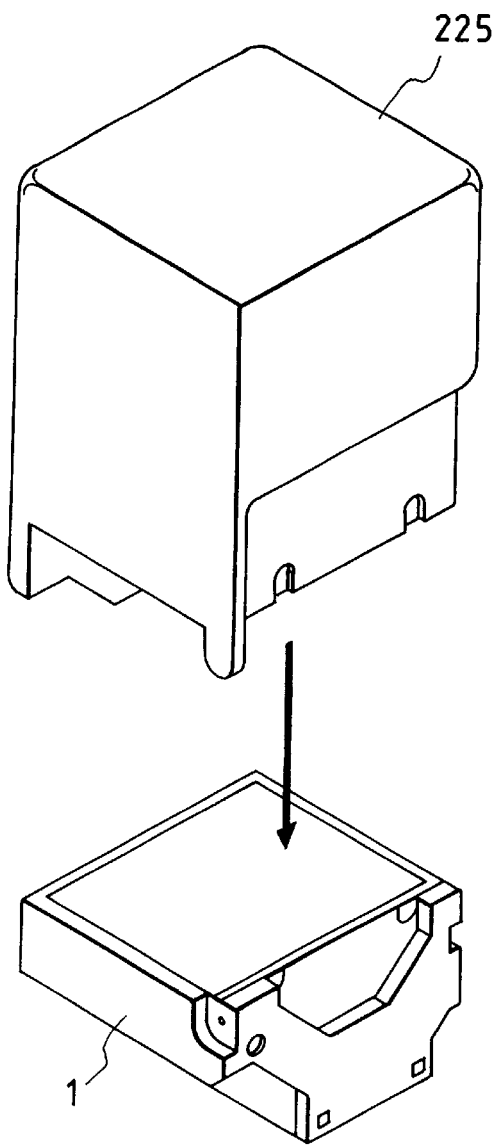
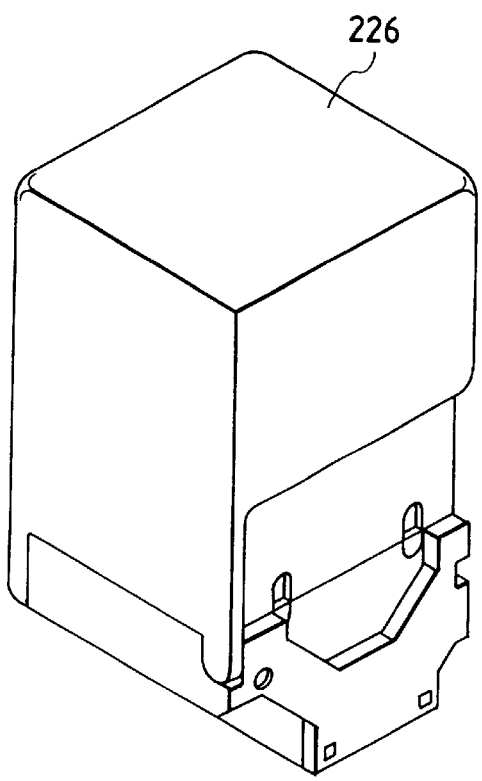

SCANNER CARTRIDGE AND INFORMATION PROCESSING APPARATUS

BACKGROUND OF THE INVENTION

1. Field of the Invention

The present invention relates to a scanner cartridge which can be detachably mounted on a recording means of a serial printer to allow the serial printer to serve as a reading device.

2. Related Background Art

In recent years, in some printers used for wordprocessors, a scanner unit having the same shape as that of a print means is attached in place of the print means to use the printer as a reading means.

Conventionally, a printer having a reading means of this type replaces a recording means held on a cartridge with a reading means and normally has the following arrangement. That is, an illumination device attached to a scanner head cartridge serving as the reading means illuminates the original surface, and the reflected image of the original is read by a sensor via a lens.

However, the conventional arrangement that replaces the recording means with the reading means to use the printer as a reading device suffers the following problems.

(1) In an ink-jet printer in which the recording means includes an ink tank and which records using ink, the color and amount of ink to be stored in the ink tank differ depending on the printer applications. For this reason, carriages that carry the recording means have various shapes. In particular, along with the recent remarkable advances of the recording techniques, novel printers and ink head cartridges have been manufactured in turn. As a consequence, a large number of types of scanner head cartridges must be manufactured in correspondence with ink head cartridges having different shapes and attachment methods. For this reason, the manufacturing cost increases very much.

(2) When the user who possesses a plurality of types of printers that can mount different ink head cartridges uses these printers as reading devices, he or she must purchase scanner head cartridges corresponding to his or her printers.

(3) In the case of a scanner head cartridge incorporating an optical system, in particular, in the case of an ink-jet printer that performs non-contact recording, adjustments of the optical system such as the focal length or the like must be performed. For this reason, a structure that allows easy adjustment must be provided.

SUMMARY OF THE INVENTION

It is an object of the present invention to simplify the apparatus arrangement in an image processing apparatus that can mount a plurality of types of cartridges that can attain different kinds of processing.

It is another object of the present invention to reduce the cost of an image processing cartridge.

It is still another object of the present invention to improve the functions of an image processing cartridge.

It is still another object of the present invention to allow to use common components between scanner and recording cartridges.

In order to achieve the above object, according to an embodiment of the present invention, there is provided a scanner head cartridge that can be held on a carriage, which moves an ink head cartridge for an ink-jet printer for performing recording on a recording medium, in place of the ink head cartridge, comprising a first case which houses optical parts required for reading, and electrical parts required for image processing, and a second case which can engage with the first case to cover an open surface of the first case, wherein positioning guide means used upon inserting the scanner head cartridge into the carriage is formed on an upper surface of the second case.

According to another embodiment of the present invention, there is provided an image processing cartridge comprising a first case incorporating an image processing unit, and a second case which engages with the first case and also engages with a movable carriage arranged on an image processing apparatus.

Furthermore, according to still another embodiment of the present invention, there is provided an information processing apparatus using a scanner head cartridge that can be held on a carriage, which moves an ink head cartridge for an ink-jet printer for performing recording on a recording medium, in place of the ink head cartridge, which comprises a first case which houses optical parts required for reading, and electrical parts required for image processing, and a second case which can engage with the first case to cover an open surface of the first case, and in which positioning guide means used upon inserting the scanner head cartridge into the carriage is formed on an upper surface of the second case.

Moreover, according to still another embodiment of the present invention, there is provided an information processing apparatus using an image processing cartridge which comprises a first case incorporating an image processing unit, and a second case which engages with the first case and also engages with a movable carriage arranged on an image processing apparatus.

With the above arrangement, an image processing apparatus that can cope with various types of cartridges can be provided. Also, an improvement in functions and a cost reduction of the image processing cartridge can be attained. Furthermore, cartridges corresponding to a plurality of different image processing functions can use common components.

Other features and advantages of the present invention will become apparent from the following specification and the accompanying drawings.

BRIEF DESCRIPTION OF THE DRAWINGS

FIGS. 32A and 32B are perspective views showing the arrangement and attachment state of an adapter that can provide the same shape as that of the recording head cartridge 201 shown in FIG. 30.

DETAILED DESCRIPTION OF THE PREFERRED EMBODIMENTS

Figure 1:
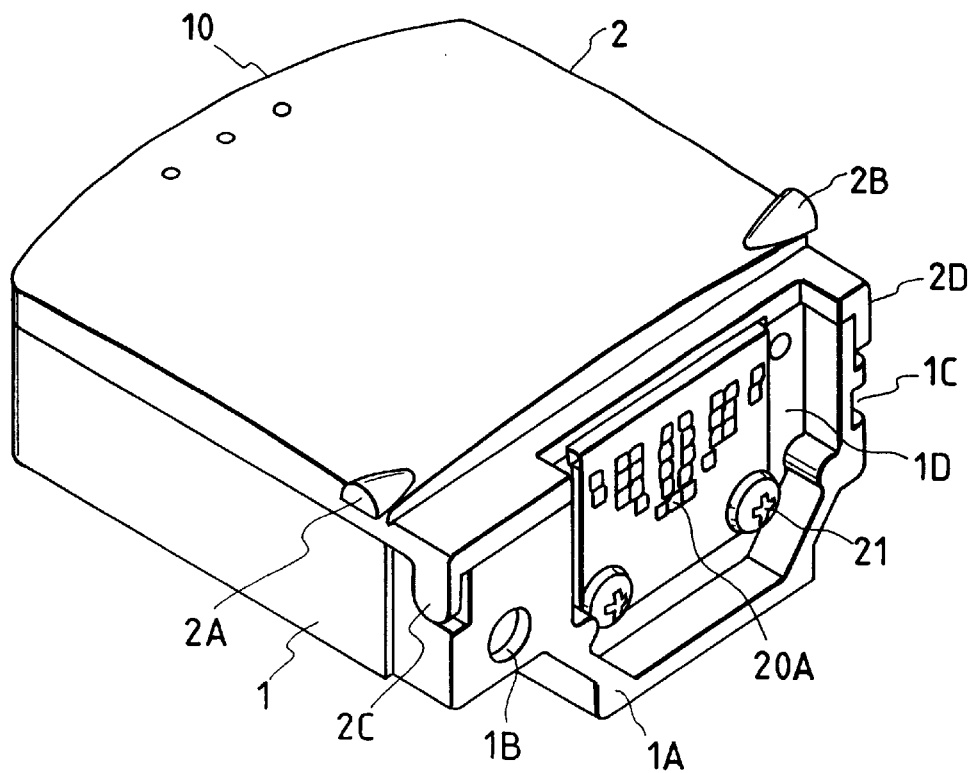
FIG. 1 is a perspective view showing the outer appearance of an embodiment of the present invention.
Figure 2:
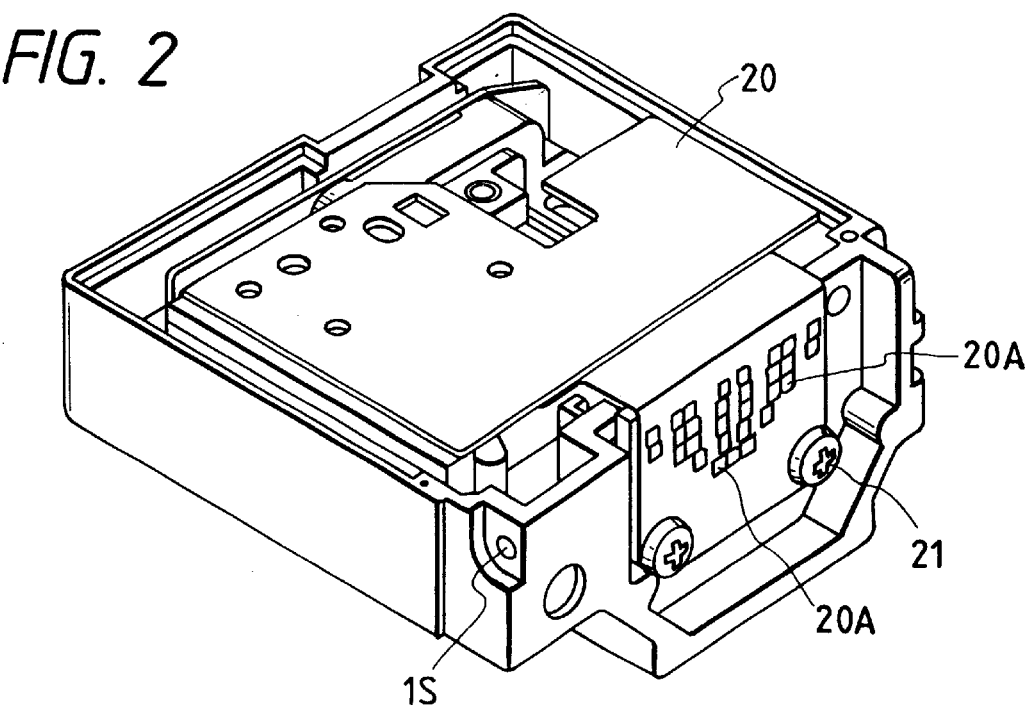
FIG. 2 is a perspective view showing the electrical parts layout in the embodiment shown in FIG. 1.
Figure 3:
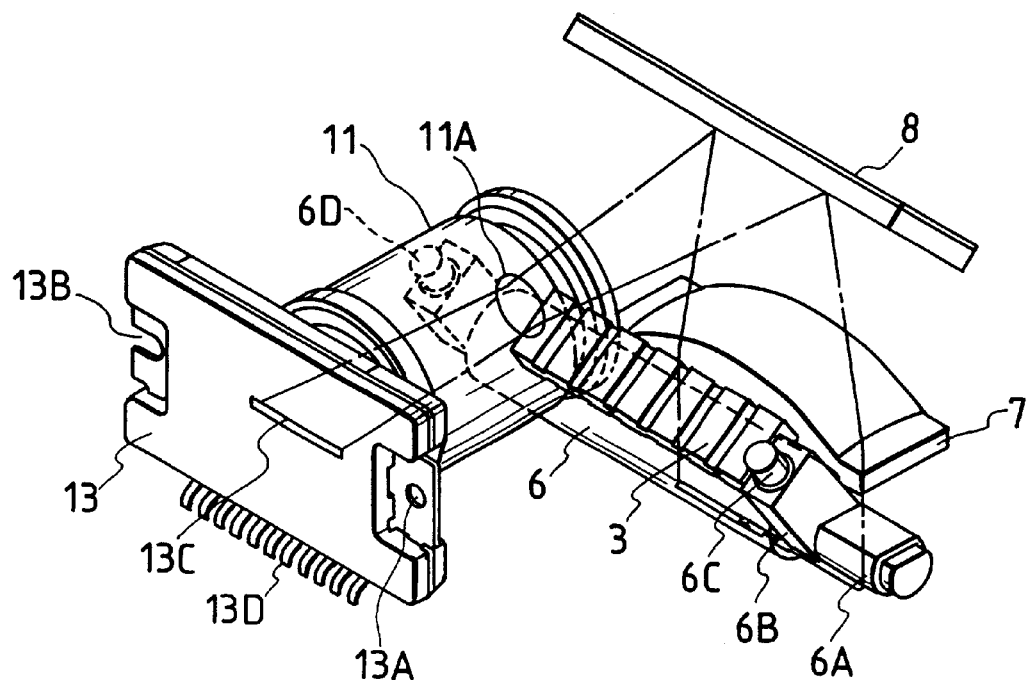
FIG. 3 is a perspective view showing the optical system parts layout in the embodiment shown in FIG. 1.

FIGS. 1 to 3 best illustrate the feature of an embodiment of a scanner head cartridge according to the present invention. FIG. 1 is a perspective view showing the outer appearance of this embodiment, FIG. 2 is a perspective view showing the electrical parts layout while an upper case 2 shown in FIG. 1 is detached, FIG. 3 is a perspective view showing the layout of optical system parts alone, and FIG. 4 is a sectional view showing the state wherein the upper case 2 and a lower case 1 are integrated.

Referring to FIG. 1, the lower case 1 carries all the parts such as optical system parts, electrical boards, and the like, and has a positioning hole 1B and a positioning groove 1C used for attaining positioning when the cartridge is set on a carriage. Also, the lower case 1 has a reference wall 1A for determining the posture in the reading direction. When mounting the cartridge on the carriage the reference wall 1A is biased against a reference wall (not shown) of the carriage side, thereby determining the mounting position of the cartridge. A connector portion 20A serves as an internal I/F that attains electrical contact upon mounting on the main body, and is fixed to a wall 1D parallel to the reference wall 1A by screws 21. The upper case 2 integrally engages with the lower case 1 to cover the open surface of the lower case 1 so as to constitute a scanner head cartridge 10.

Each of the upper and lower cases 2 and 1 has an engaging means and a coupling means that ensures integration by means of the engaging means. As the engaging means, the upper case 2 has hinge portions 2C and 2D, and the lower case 1 has rotation holes 1S (see FIG. 2) that receive the hinge portions 2C and 2D. When the hinge portions 2C and 2D are inserted into the rotation holes 1S, the upper case 2 is pivotally supported by the lower case 1.

Figure 4:
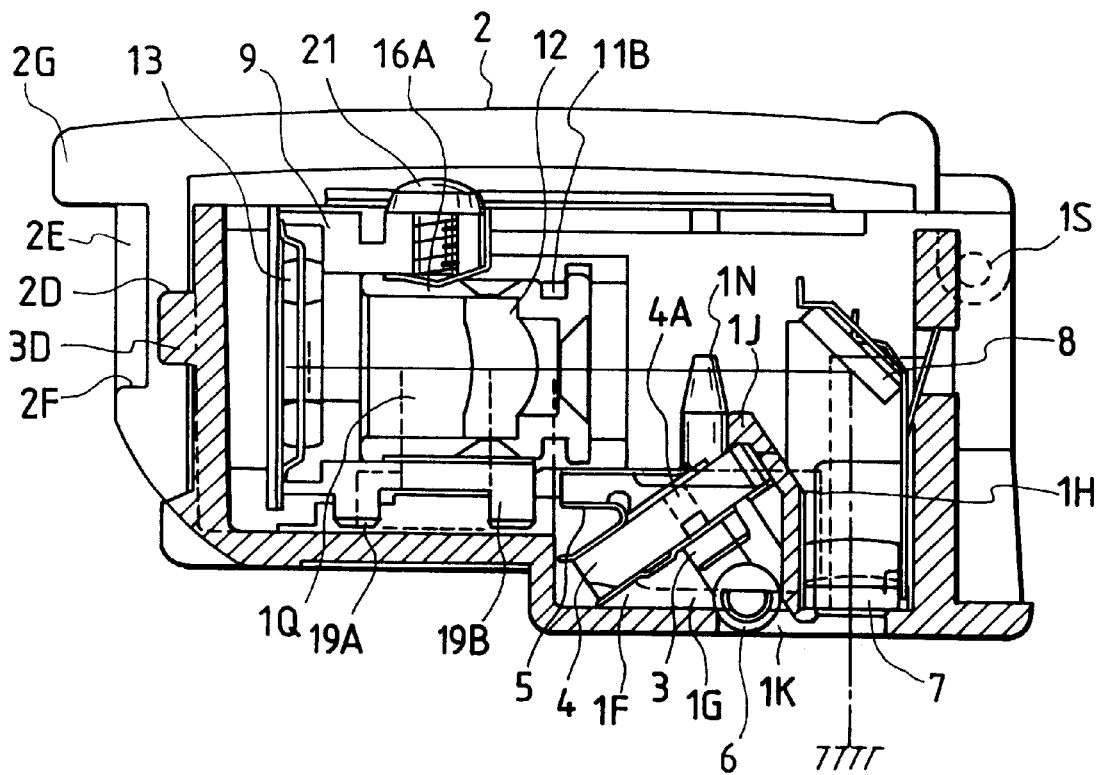
FIG. 4 is a side view showing the internal arrangement in the embodiment shown in FIG. 1.

As shown in FIG. 4, the lower case 1 has a projection 3D projecting from a side wall on the side opposite to the side of the rotation holes 1S, and the upper case 2 has a projection (locking member) 2F formed with an indentation 2D which has a shape matching that of the projection 3D. The projection 2F and the surface of the lower case 1, that opposes the projection 2F, constitute the coupling means.

The indentation 2D of the projection 2F, and the projection 3D constitute a fitting means, and when they fit with each other, the scanner head cartridge 10 that integrates the upper and lower cases is formed.

Note that the projection 2F may have a projection in place of the indentation 2D, and an indentation may be formed in place of the projection 3D.

The upper case 2 is opened/closed upon adjusting the internal optical system. An eave portion 2G that allows easy opening/closing is formed on the indentation 2D side where the projection 2F of the upper case 2 is formed.

Lugs 2A and 2B serving as positioning guide means are formed on the upper case 2. Upon inserting the scanner cartridge into the main body carriage, the lugs 2A and 2B contact the carriage, thus fitting the positioning hole 1B and the positioning groove 1C with positioning portions (not shown) on the carriage side.

FIG. 2 is a perspective view with the upper case 2 being removed.

A flexible board 20 carries electrical parts, and has a substantially box shape that surrounds the internal optical system parts. The flexible board 20 has the connector portion 20A at one end portion, and has an image sensor 13 (see FIG. 3) attached at the other end portion. Furthermore, LEDs serving as a light source (to be described later), an image processing circuit (not shown), and the like are mounted on the board 20.

The optical system layout in this embodiment will be explained below with reference to FIGS. 3 and 4.

A plurality of LEDs 3 ($\lambda$=570 nm) serve as a light source, and are arranged in a direction parallel to the read width direction to extend over the range longer than the read width.

A cylindrical rod lens 6 serving as a focusing means is arranged in the vicinity of the LEDs 3 as the light source in a direction parallel to the arrangement direction of the LEDs 3. The illumination center of the LEDs 3 passes through the center of the lens effect surface of the rod lens 6 to obliquely illuminate the original surface.

Light reflected by an original passes through a field lens 7 serving as a first imaging system lens, the center of the optical axis of which agrees with a direction substantially perpendicular to the original. The propagation direction of the reflected light passing through the field lens 7 is bent 90° by a mirror 8 which is arranged parallel to the read width direction, so that the reflected light becomes light rays nearly parallel to the original.

An aperture 11A is arranged at a position of the imaging surface of the field lens 7 serving as the first imaging system lens. An imaging lens 12 serving as a second imaging system lens is arranged behind the aperture 11A.

The imaging position of the imaging lens 12 coincides with the position of a photoelectric conversion element 13C. The photoelectric conversion element 13C is electrically connected to and integrated with the flexible board 20 by soldering its connection portion 13D to the flexible board 20, and is packaged as the image sensor 13. Note that the layout of the imaging system lenses is set to have a reduction ratio=0.45.

The assembly state of the optical system parts will be described below. A radiation plate 4 using an aluminum plate is adhered to that portion, on the rear side of the flexible board 20, that has the LEDs 3 formed thereon, by a double-sided conductive adhesive tape. The illumination angle of the LEDs 3 is determined by setting the flexible board 20 and the radiation plate 4 on triangular ribs 1F and 1H of the lower case 1, and the radiation plate 4 is fixed when a rod lens holder 5 for supporting the rod lens 6 and a pawl portion 1J of the lower case hold the two ends of the radiation plate 4.

In FIG. 3, the rod lens 6 is arranged as a focusing means for increasing the light amount of the light source and has a cylindrical lens portion. The LEDs 3 as the light source are set, so that when rod lens projections 6C and 6D formed on non-illumination portions at the two ends of the rod lens 6 are fitted into positioning holes 4A of the radiation plate 4, their illumination center passes through the center of a circle in a direction perpendicular to the cylindrical direction of the rod lens 6, as described above.

Rod lens bases 6A coaxial with the cylindrical shape of the lens portion are arranged at the two ends of the rod lens 6, and are set on a groove 1K of the lower case 1, thereby determining the central position of the rod lens 6.

The rod lens bases 6A have D-cut portions, and are fixed by the two bent end portions of the rod lens holder 5. The D-cut portions have slightly large-height portions on the sides of the triangular ribs 1F and 1H of the lower case 1, and pivot counterclockwise in FIG. 4 when they are pushed downward by the rod lens holder 6. In this state, rod lens arms 6B are biased against a triangular rib 1G of the lower case 1, thus integrally fixing the rod lens 6 and the radiation plate 4.

A fixing projection 1N of the lower case 1 is inserted through the two ends of the rod lens holder 5 to serve as a stopper of the rod lens holder 5.

The optical axis on the oblique incident side determined by the triangular ribs 1F and 1G is offset by 1.5° to be separated farther in the depth direction from the central position of the original surface on the optical axis of the imaging system lens.

Figure 5:
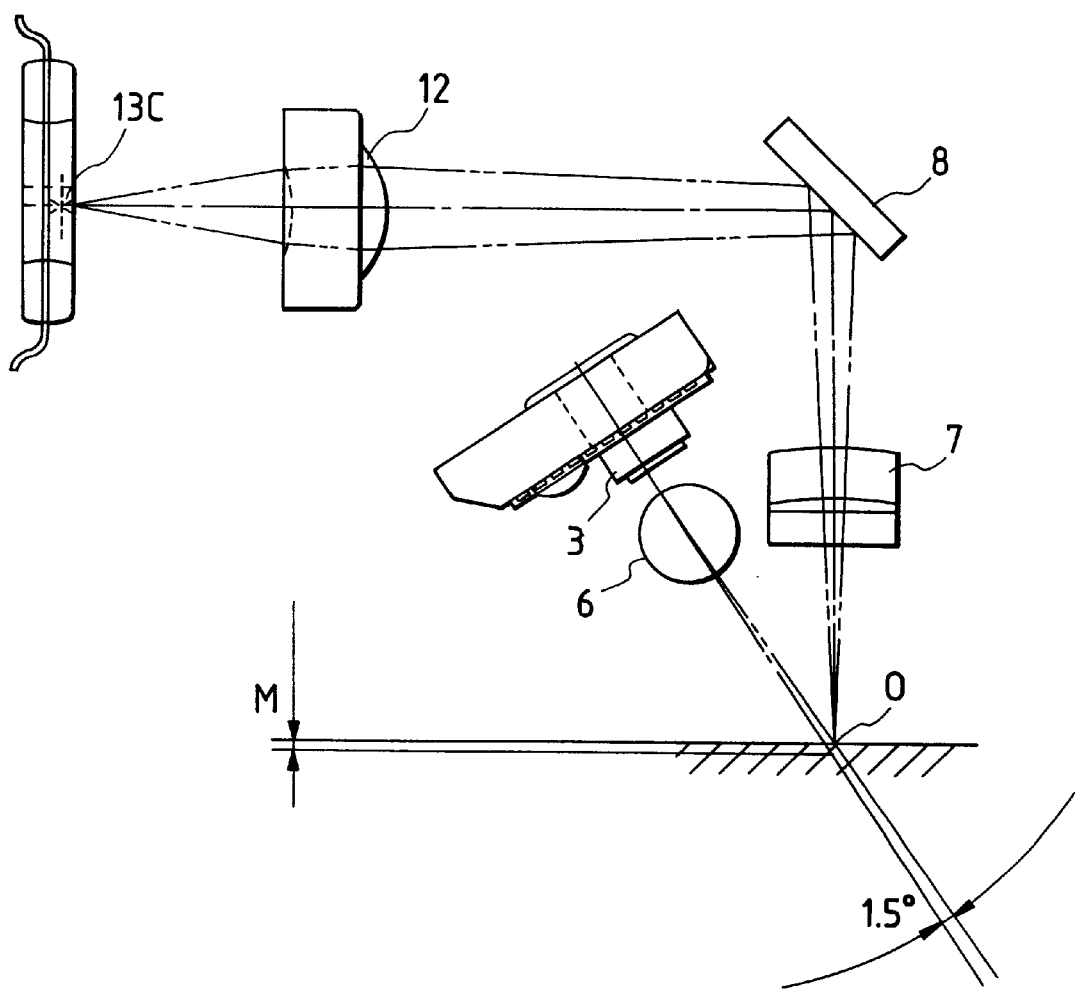
FIG. 5 illustrates the relationship between the read position and the illumination position of a light source in the embodiment shown in FIG. 1.

FIG. 5 illustrates the relationship between the read position and the illumination position of the light source in this embodiment.

In this embodiment, the read position of the photoelectric conversion element 13C via the field lens 7, mirror 8, and imaging lens 12 corresponds to an original surface O. On the other hand, the illumination center of the LEDs 3, which passes through the rod lens 6, corresponds to a position deeper by a distance M than the original surface, and agrees with a direction obtained by rotating the optical axis with respect to the original surface O clockwise in FIG. 5 by 1.5°. Such position is selected to minimize changes in light amount upon changing the height of the original surface in consideration of the directivity of the LEDs 3 and the focusing characteristics of the rod lens 6.

Figure 6:
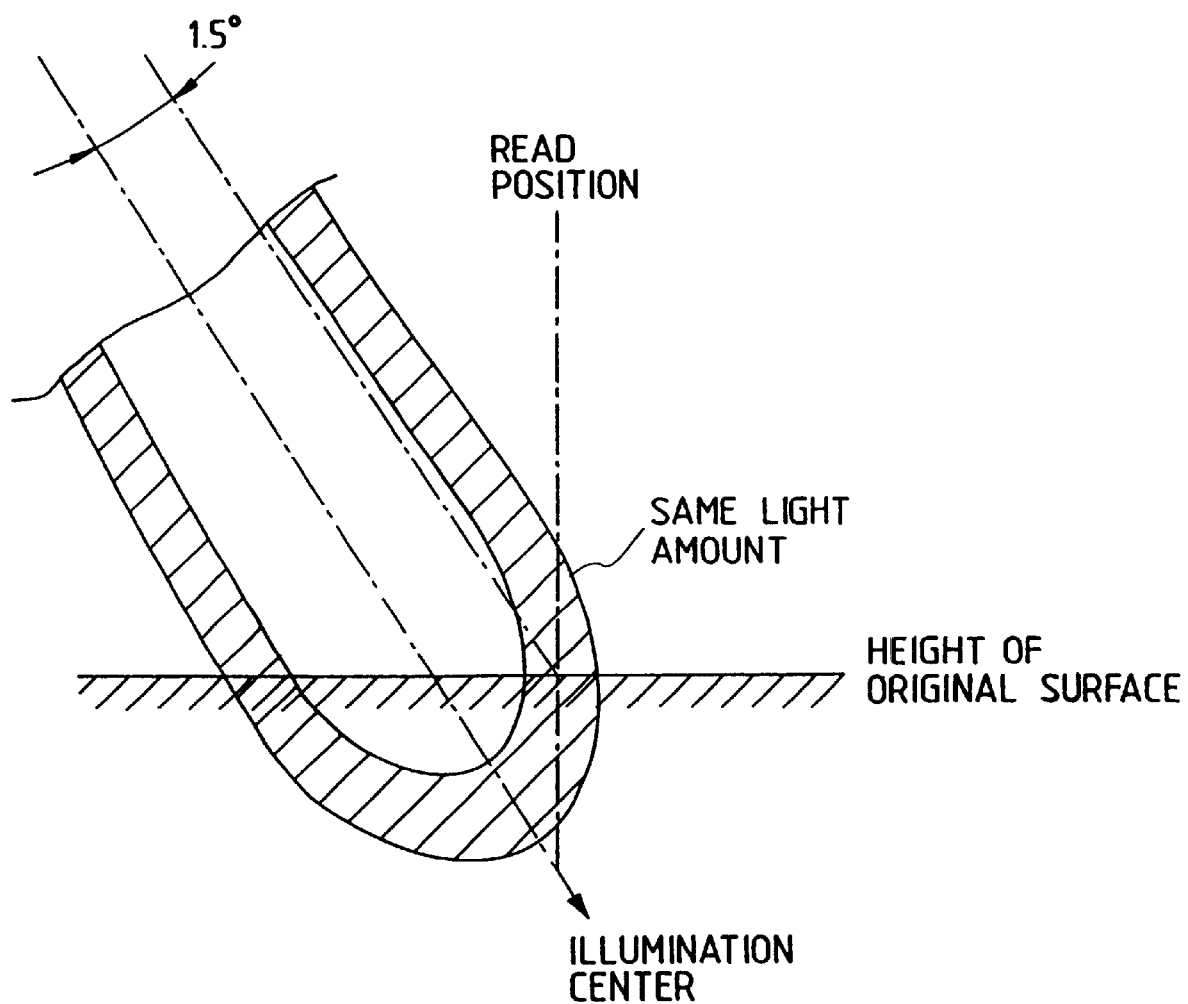
FIG. 6 shows the reference position of the height of the original surface and the light amount distribution around the reference position.

FIG. 6 illustrates the reference position of the height of the original surface, and the light amount distribution around the reference position. As can be seen from FIG. 6, even when the height of the original surface changes with respect to the read position, changes in light amount can be small.

As described above, since the illumination center of the light source points a position deeper, in the depth direction, than the reference position of the height of the original surface, changes in output upon changing the sheet interval from the reference position can be minimized. Accordingly, even when the original position changes, a high resolution can be maintained, and density nonuniformities can be eliminated.

Figure 7:
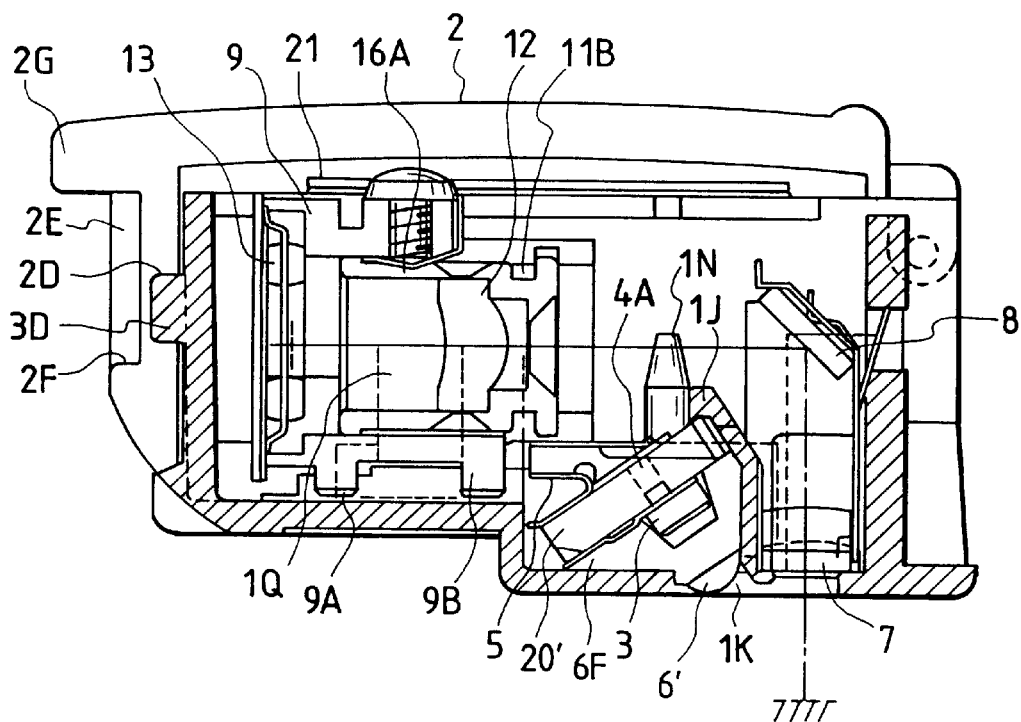
FIG. 7 is a sectional view showing the relationship among an LED board 20', a cylindrical lens 6', and a lower case 1 in another example.

FIG. 7 shows the relationship among an LED board 20', a cylindrical lens 6', and the lower case 1 in another example.

In the example shown in FIG. 7, the LED board 20' also serves as an LED cooling board by forming patterns on an aluminum board, and can determine the positions of the lens and the LEDs by projections 6C and 6D (not shown) of the cylindrical lens 6'. The angle the board 20' makes with the lower case 1 is determined by triangular ribs 6F formed on the two ends of the cylindrical lens 6' in the arrangement direction of the LEDs. When the cylindrical lens 6' is biased against the lower case 1 by the rod lens holder 5, light emitted by the LEDs 3 and focused by the cylindrical lens 6' illuminates the original surface.

In this case, electrical connections between the flexible board 20 and the LED board 20' are attained by soldering.

Since the LEDs 3 are directly mounted on the aluminum board, the cooling effect can be improved.

Figure 8:
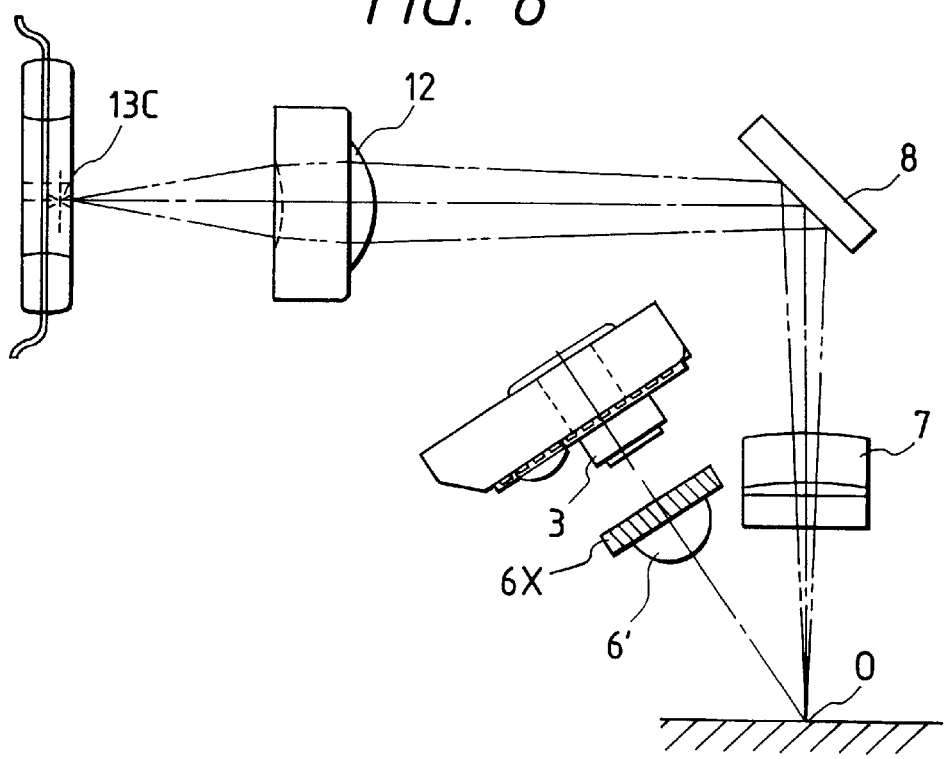
FIG. 8 illustrates the relationship between the read position and the illumination position of a light source in another example.

FIG. 8 shows the relationship between the read position and the illumination position of the light source in another example.

In the example shown in FIG. 8, since the cylindrical lens 6' having lower focusing characteristics than the rod lens 6 is used, the illumination center of the LEDs 3 as the light source passes through the original surface O. Also, a diffusion plate 6X is arranged between the LEDs 3 and the cylindrical lens 6'.

Since the illumination center of the LEDs 3 passes through the original surface O, even when the actual height of the original surface changes in an original with a large read width, the marginal rays change little since the cylindrical lens 6' has lower focusing characteristics than the rod lens 6.

The above-mentioned effect can be further improved by arranging the diffusion plate 6X. More specifically, when the diffusion plate 6X is arranged, not only the light-emitting points of the LEDs but also the entire diffusion plate 6X can be considered as a light-emitting portion, and the original surface can be illuminated with light nearly equal to collimated light.

With this arrangement, changes in light amount can be small even when the height of the original surface changes.

Furthermore, even when a plurality of LEDs are arranged in line in a direction parallel to the read width direction, or even when the LEDs are arranged on a board offset from a line connecting the original center and the center of the cylindrical lens 6', changes in light amount upon changes in height of the original surface can be reduced, thus improving the productivity.

Figure 9A:
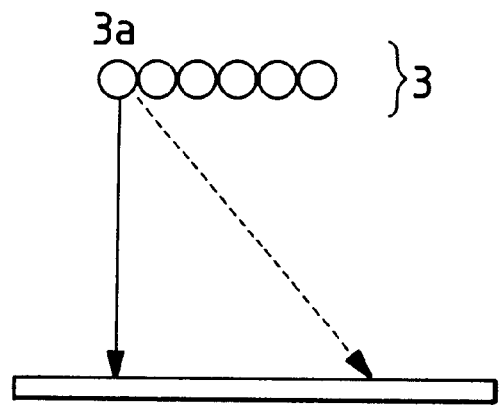
FIGS. 9A, 9B, and 9C are views for explaining the diffusion effect by a diffusion plate.
Figure 9B:
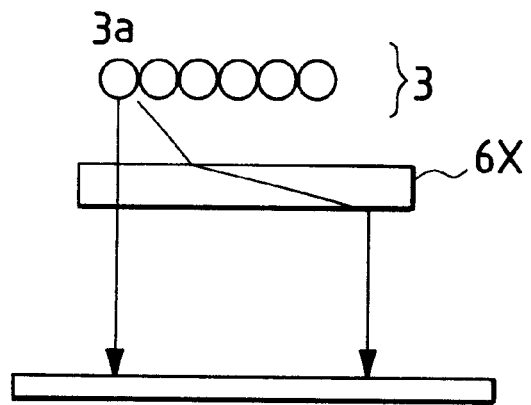

The illumination region of each LED 3a of the LEDs 3 will be explained below. When no diffusion plate is arranged, a region in front of the optical axis indicated by the solid arrow in FIG. 9A is illuminated with strong light, but a region separated from the region in front of the optical axis, as indicated by the broken arrow in FIG. 9A is illuminated with weak light. Upon illuminating the diffusion plate 6X, as shown in FIG. 9B, the intensity difference between light components illuminating the above regions can be reduced.

Figure 9C:
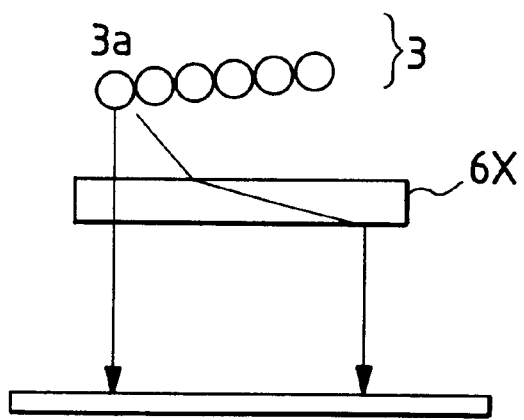

Also, even when the LEDs 3 are obliquely attached, as shown in FIG. 9C, the intensities of light components illuminating the individual regions can be roughly uniformed. With this arrangement, the precision required for attachment can be low, thus anticipating further improvements of the productivity.

As the scanner head cartridge, a monochrome scanner head cartridge using a single-wavelength light source and a color scanner head cartridge using multi-wavelength light sources are available. It is particularly effective for the color scanner head cartridge to add the diffusion plate. When a plurality of LED light sources with different wavelengths are arranged in line in a direction parallel to the read width direction, illumination nonuniformity is produced depending on the positions of the LED light sources of different wavelength, and different color tones are formed due to changes in light amount. Furthermore, when the change amounts differ in units of pixels, color nonuniformity occurs, thus causing image abnormalities.

Since the diffusion plate 6X can reduce the illumination nonuniformity depending on the positions and changes in light amount in units of wavelengths even in the arrangement direction of the plurality of LEDs, it is particularly effective for removing color image abnormalities.

The arrangement of the LEDs 3 in the color scanner head cartridge will be described below with reference to FIGS. 10 and 11.

Figure 10:
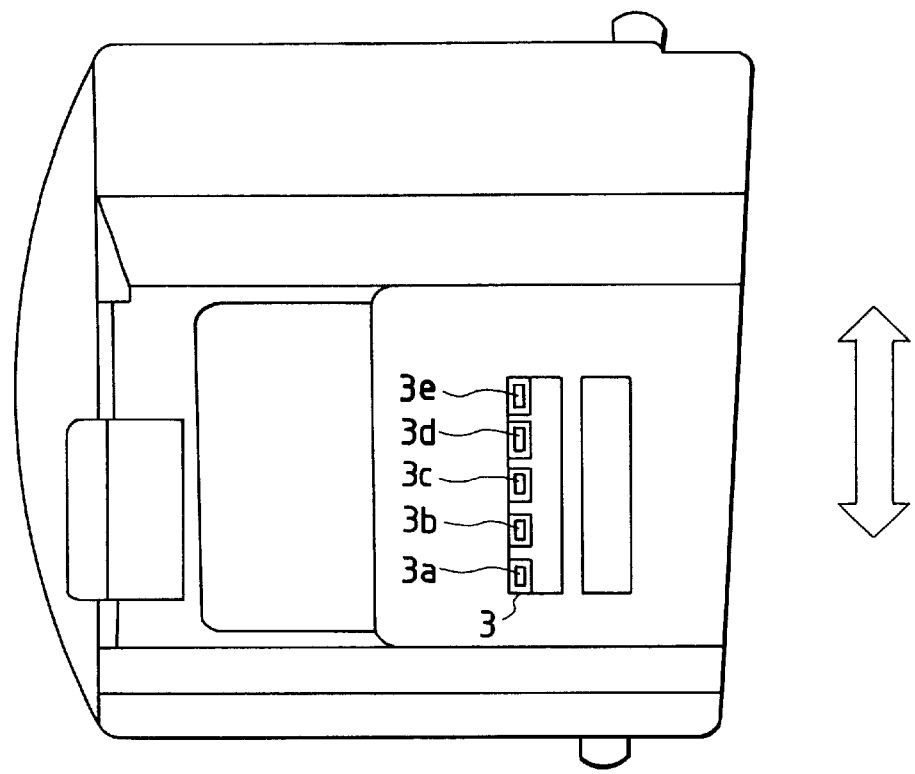
FIG. 10 is a view showing the arrangement of LEDs on a color scanner head cartridge.

FIG. 10 is a bottom view of a reading unit when viewed from the original side. In FIG. 10, the LEDs 3 for illuminating the original include a plurality of LEDs 3a to 3e which are arranged in line in the original read width direction (a direction indicated by the arrow in FIG. 10).

Figure 11:
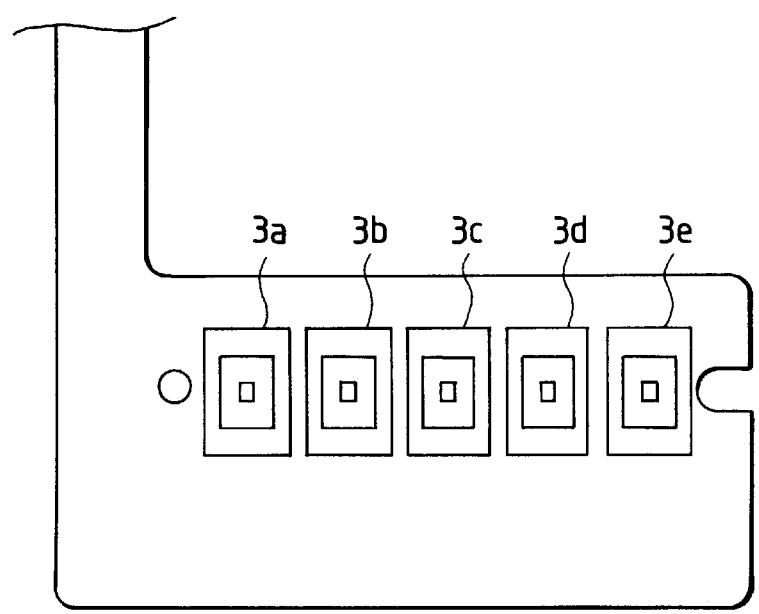
FIG. 11 is a view showing the arrangement of the LEDs on the color scanner head cartridge.

FIG. 11 is an explanatory view for explaining the arrangement of the LEDs 3. In FIG. 11, the LEDs 3 are constituted by arranging five LEDs 3a to 3e in line on a single circuit board. Of the arranged LEDs, the central LED 3c is a first LED that emits blue light, the LEDs 3b and 3d are second LEDs that emit green light, and the LEDs 3a and 3e are third LEDs that emit red light. The individual LEDs are arranged to have the same LED illumination fields on the original. In this manner, the reason why the plurality of LEDs are arranged to have the same LED illumination fields on the original in the original read width direction is to obtain good light amount balance by correcting a decrease in intensity of marginal light since the intensity of marginal light is lower than that at the central portion of the illumination region of light when a single LED is used, as described above. Note that the number of LEDs can be varied in correspondence with the length to be covered by the LEDs 3.

As described above, according to this embodiment, since the plurality of LEDs are used as the LEDs 3 in place of a fluorescent lamp unlike in the conventional device, a size reduction, a cost reduction, and energy savings of the image reading device can be attained.

Since the plurality of LEDs are arranged to have the same LED illumination fields in the original read width direction, a light amount large enough to read an image and good light amount balance can be obtained, thus obtaining a high-quality read image. Since the plurality of LEDs are arranged on a single circuit board, a cost reduction of the image reading device can be attained. Since one LED that emits blue light is arranged at the center, a plurality of expensive LEDs that emit blue light need not be arranged, thus further reducing cost.

Since the rod lens 6 having a nearly circular sectional shape is used as an illumination lens, the light intensity of an LED, marginal rays of which have a lower light intensity, can be effectively utilized, i.e., the intensity of light that illuminates the original can be increased by a simple arrangement, thus attaining higher-quality image reading.

Note that the plurality of LEDs can be mounted on a single circuit board together with the image processing circuit using, e.g., the flexible board 20. With this arrangement, the cost can be further reduced.

As the light source, a fluorescent lamp is normally used. As described above, since the light source is constituted by a plurality of LEDs which have different spectral characteristics and are arranged in a predetermined layout, a size reduction, a cost reduction, and energy savings of the image reading device can be attained as compared to a conventional image reading device that uses a fluorescent lamp as the light source.

The driving method of the LEDs 3 will be described below. Before reading, a current is supplied to the light source for a predetermined period of time to pre-heat the light source, and thereafter, a predetermined temperature is maintained by supplying a low current to the light source. In this manner, since the temperature of the light source is made stable, changes in output can be eliminated, and image density nonuniformities that may occur as the read time elapses can be reduced. Also, since the light source is pre-heated, the wait time for the second and subsequent originals can be shortened.

Figure 12:
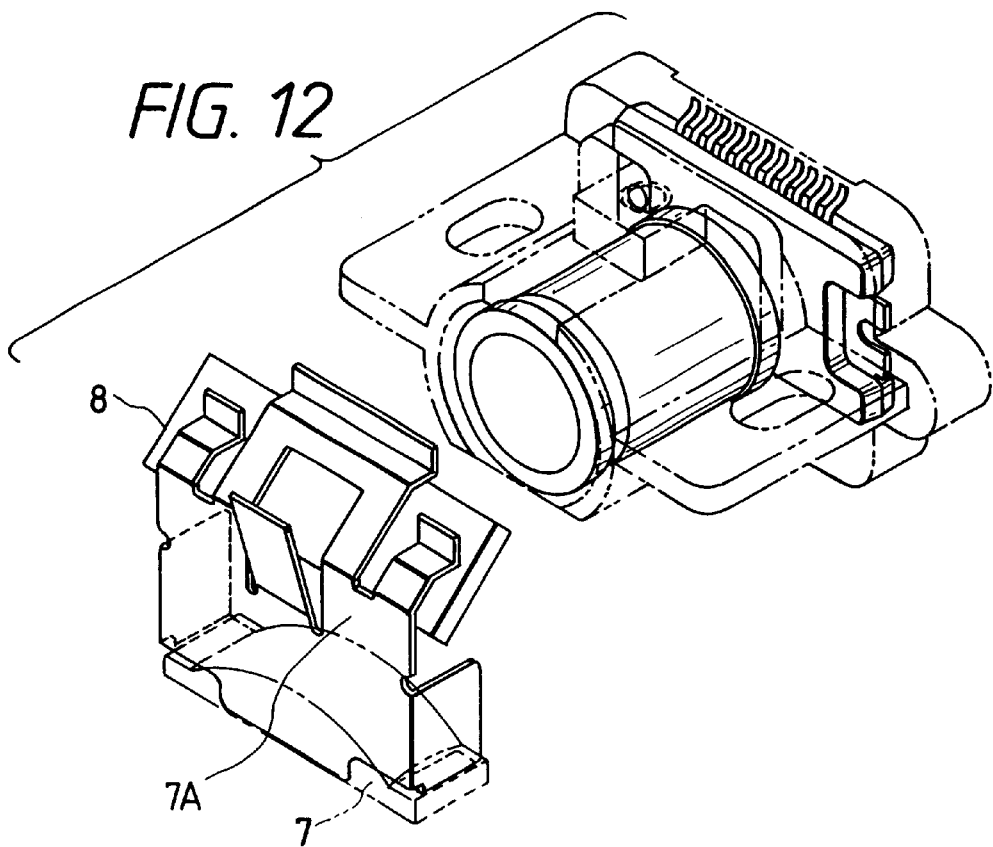
FIG. 12 is a perspective view showing the method of fixing optical system parts in the embodiment shown in FIG. 1.

The fixing method of the field lens 7 and the mirror 8 in this embodiment will be described below with reference to FIG. 12.

A mirror holder 7A comprises a leaf spring having a roughly concave shape, and has a field lens positioning/fixing means on its lower portion and a mirror positioning/fixing means on its upper portion, so as to have the positioning functions of both the lens and mirror.

Figure 13:
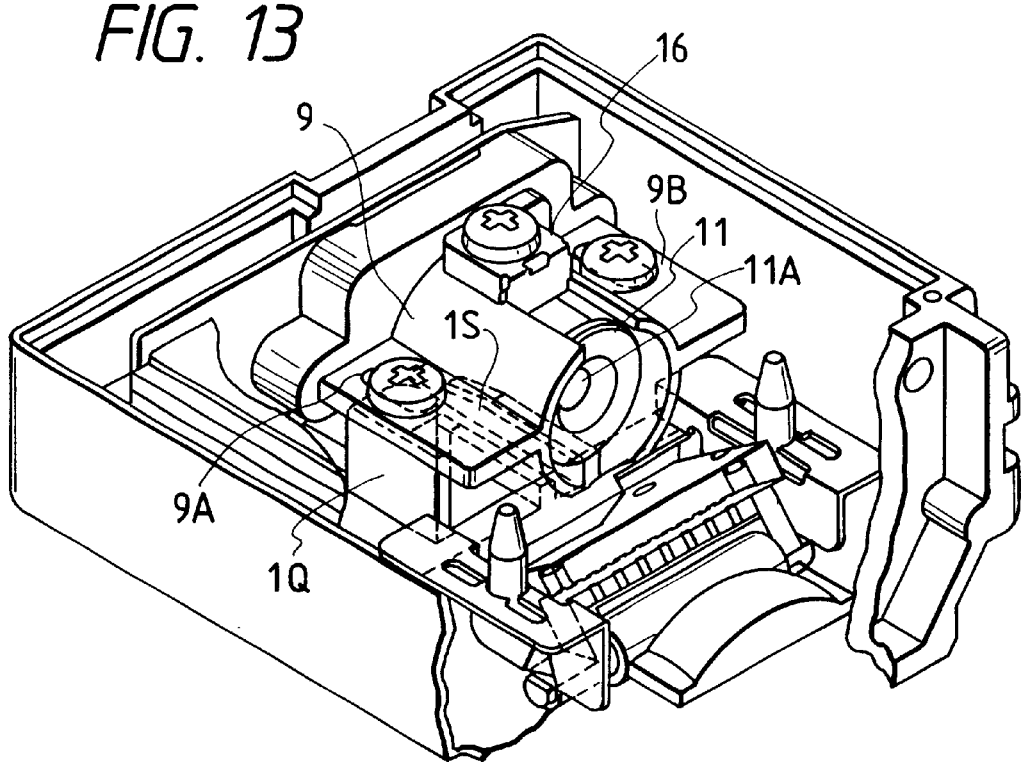
FIG. 13 is a perspective view showing a lens adjustment unit in the embodiment shown in FIG. 1.

The method of adjusting and positioning the imaging lens 12 will be described below with reference to FIGS. 4 and 13.

The imaging lens 12 as the second imaging system lens is adhered and fixed to a cylindrical lens barrel 11 that forms an aperture 11A. The lens barrel 11 is slidable along the inner circumferential surface of a lens holder 9, and its movement is adjusted by inserting a jig (not shown) into a barrel groove 11B. A lens stopper 16 consists of a leaf spring, and its V-shaped portion 16A is temporarily locked to always bias the lens barrel 11 downward. After adjustment, the V-shaped portion 16A is permanently locked by a screw 21.

The lens holder 9 slides in slide grooves of the lower case 1 formed with grooved projections 19A and 19B extending parallel to the optical axis. The inner circumferential surface of the lens holder 9 is parallel to the grooved projections 19A and 19B, and the imaging lens 12 moves in a direction parallel to the optical axis, thus determining its position in the Y-direction. Collars 9A and 9B slide on ribs 10 having flat surfaces flush with the optical axis parallel to the original surface. Elongated holes are formed on the collars 9A and 9B, and after the position of the lens holder 9 is adjusted, the collars 9A and 9B are fixed by screws via these holes.

An image sensor comprising the photoelectric conversion element 13C shown in FIG. 3 is arranged behind the imaging lens 12. The image sensor has positioning holes 13A and 13B on a line parallel to the extending direction of the photoelectric conversion element 13C. The positioning holes 13A and 13C are fitted on positioning projections (not shown) on the lens holder parallel to the collars 9A and 9B, thus determining the optical axis in the Z-direction.

The image sensor is fixed to the lens holder 9 by a screw via a fixing hole (not shown) of the soldered flexible board 20.

Since the optical system lenses in this embodiment have telecentricity, as described above, changes in magnification are little.

The attachment state of the scanner head cartridge of this embodiment with the above arrangement to the recording apparatus main body will be described below with reference to FIG. 14.

Figure 14:
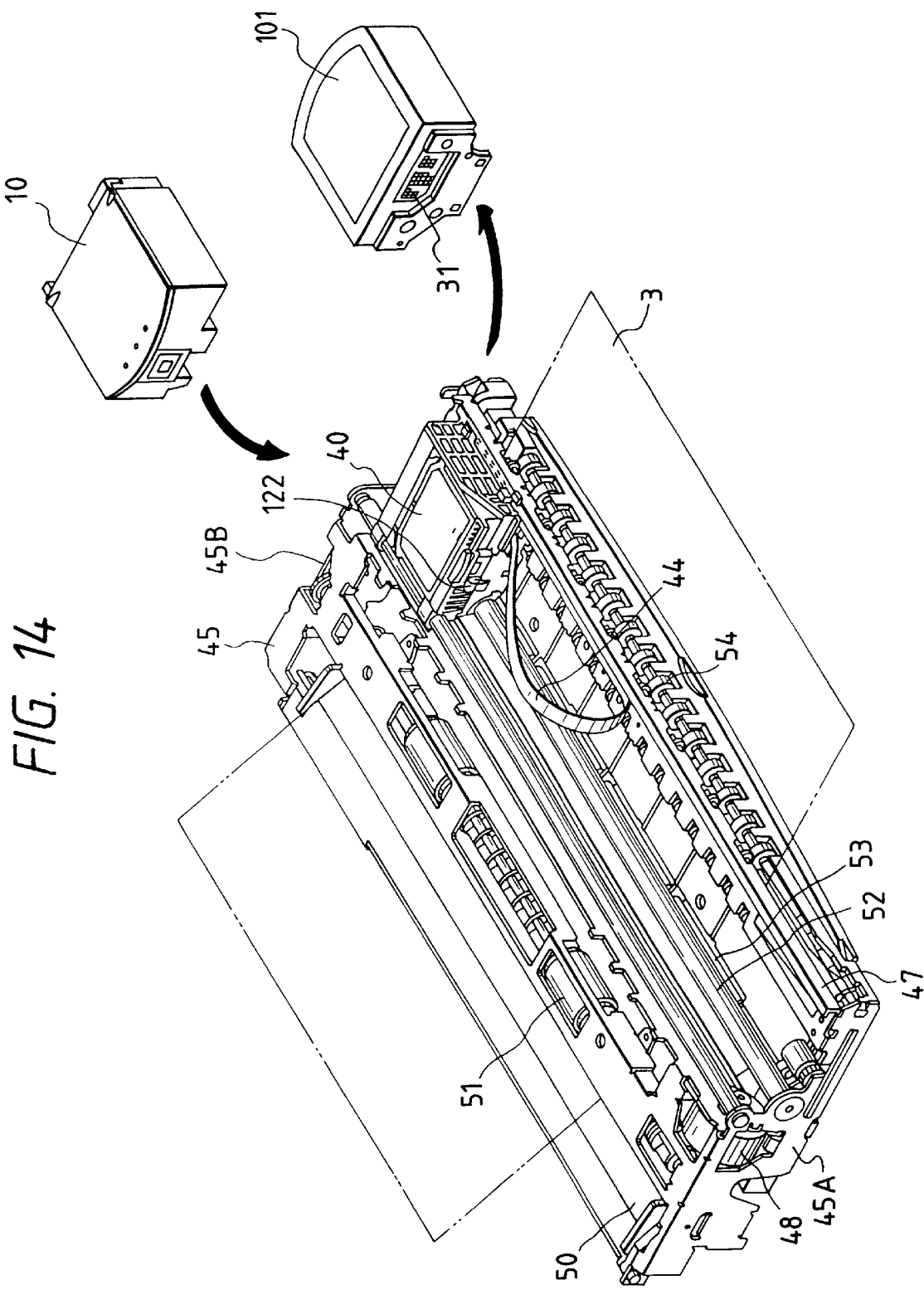
FIG. 14 is a perspective view showing the main body attachment state in the embodiment shown in FIG. 1.

In FIG. 14, a detachable scanner head cartridge 10 can be exchanged with a recording head cartridge 101 that performs recording on a recording medium.

The scanner head cartridge 10 has the same shape as that of the recording head cartridge 101 used in printing, and has the connector portion 20A common to the recording head cartridge as an electrical connection portion to the main body.

A carriage 40 has a contact portion (not shown) which receives a read control signal from the main body via the connector portion 20A of the scanner head cartridge 10. The scanner head cartridge 10 is pressed against the contact portion by a head guide 122 serving as a carriage holding means, thus reliably coupling the carriage 40 and the scanner head cartridge 10.

A read signal is processed by a CPU in the apparatus main body via a contact portion 41 and a flexible cable 44.

The carriage 40 reciprocally moves along a slide shaft and a slide plate 47 between side plate portions 45A and 45B of a frame 45, thus attaining reading. A driving motor 48 moves the carriage 40 via a belt.

A paper feed stacker 50 is used for feeding an original. When the recording apparatus is used as a printer, a recording paper sheet is inserted in the stacker 50. An original 3 is fed from the position behind the printer from the paper feed stacker 50 by feed rollers 51, and is conveyed to the read position beneath the carriage 40 by an LF roller 52 and press rollers 53. Then, the original 3 is intermittently line-fed by the read width, and is then discharged by discharge rollers 54.

Figure 15:
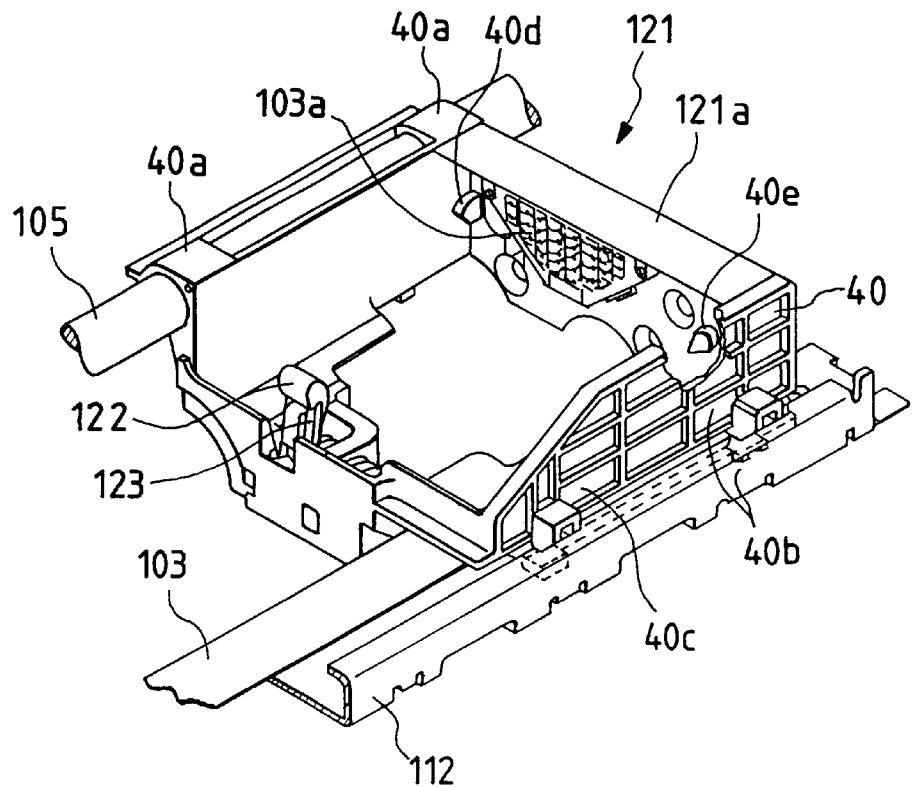
FIG. 15 is a perspective view of a carriage of an ink-jet recording apparatus shown in FIG. 14.

The carriage will be described below with reference to FIG. 15. FIG. 15 is a perspective view of the carriage 40 of the ink-jet recording apparatus shown in FIG. 1.

The carriage 40 has a frame shape as a whole, and the scanner head cartridge 10 or the recording head cartridge 101 is set in its hollow portion. Two bearing portions 40a are integrally arranged on the back surface of the carriage 40, and receive a guide shaft 105. On the front surface of the carriage 40, a guide rail clamp portion 40b and a carriage deformation prevention stopper 40c are arranged as two clamp portions. The guide rail clamp 40b is arranged on the side of a cable press 121, and the carriage deformation prevention stopper 40c is arranged on the side of a head guide 122. Each of the guide rail clamp portion 40b and the carriage deformation prevention stopper 40c is constituted by two members that protrude to be separated vertically by a predetermined distance so as to sandwich a planar guide rail 112 therebetween. In this manner, the carriage 40 is supported by the two bearing portions 40a, the guide rail clamp portion 40b, and the carriage deformation prevention stopper 40c. With this arrangement, the carriage 40 is supported to be parallel to a base 114 (see FIG. 1), and the distance between a nozzle portion 150 (see FIG. 17) of the recording head cartridge 101 attached to the carriage 40 and a recording medium P can be maintained nearly constant.

Note that the interval between the two members which constitute the carriage deformation prevention stopper 40c is larger than that between the two members which constitute the guide rail clamp portion 40b, and the carriage 40 is supported, in fact, at three points except for the carriage deformation prevention stopper 40c. In order to support the carriage 40 to be parallel to the base 114, the carriage 40 need only be supported at three points which are not aligned in a line, in consideration of the slide load of the carriage 40. Furthermore, the carriage deformation prevention stopper 40c is added to prevent an unwanted displacement and deformation of the carriage 40 due to the loads acting on the guide rail clamp portion 40b and the bearing portions 40a upon attaching/detaching the recording head cartridge 101 to/from the carriage 40, thereby preventing operation errors. Also, the carriage deformation prevention stopper 40c is arranged on the head guide 122 side since a force acts on the head guide 122 upon attaching/detaching the recording head cartridge 101 to/from the carriage 40, as will be described later.

A flexible cable 103 extends along a predetermined route, and is fixed by the cable press 121, so that a cable terminal portion 103a arranged at the distal end portion of the cable 103 is located inside the right side wall in FIG. 15 of the carriage 40. The cable terminal portion 103a contacts a head terminal portion 153 (see FIG. 17) of the recording head cartridge 101 when the recording head cartridge 101 is attached to the carriage 40, thus attaining electrical connections with the recording head cartridge 101.

The cable press 121 is formed by bending a conductive planar member such as a stainless steel plate, and its upper end portion is formed as a cover portion 121a that overhangs toward the interior of the carriage 40 to cover the cable terminal portion 103a. A portion of the cable press 121 contacts the GND pattern of the flexible cable 103. More specifically, the cable press 121 is connected to ground via the flexible cable 103. When the operator attaches/detaches the recording head cartridge 101 to/from the carriage 40, static electricity induced on the fingers and the like of the operator or static electricity accumulated on the recording head cartridge 101 is discharged to GND via the cable press 121. With this arrangement, the above-mentioned static electricity can be prevented from being discharged to the cable terminal portion 103a so as not to damage the control board of the ink-jet recording apparatus.

Since the cover portion 121a is formed above the cable press 121, the cable terminal portion 103a is located beneath the cover portion 121a, and the fingers or the like of the operator can hardly touch the cable terminal portion 103a. As a consequence, the above-mentioned static electricity is easily discharged to the cable press 121, and furthermore, the cover portion 121a can protect the cable terminal portion 103a itself.

Two head positioning projections 40d and 40e are integrally formed on the surface of the carriage 40, where the cable terminal portion 103a is located. One head positioning projection 40d has a square shape, and is formed at the deeper side than the cable terminal portion 103a. The other positioning projection 40e has a circular shape with a conical distal end portion, and is arranged in front of the cable terminal portion 103a. In the state wherein the recording head cartridge 101 is set on the carriage 40, as will be described later, one head positioning projection 40d fits in a cut-out groove 153a (see FIG. 17) of the recording head cartridge 101, and the other positioning projection 40e fits in a head positioning hole 153b (see FIG. 17) of the recording head cartridge 101, thereby accurately positioning the recording head cartridge 101 with respect to the carriage 40. As can be seen from the above description, the individual head positioning projections 40d and 40e constitute a positioning means for the carriage 40, and the head positioning cut-out groove 153a and the head positioning hole 153b constitute a positioning means of the recording head cartridge 101.

Furthermore, a contact spring 123 is arranged on the portion of the carriage 40, that opposes the cable terminal portion 103a, and the head guide 122 formed of a resin is fixed to the distal end portion of the contact spring 123. More specifically, the head guide 122 is elastically supported by the carriage 40. As will be described later, the head guide 122 fits on a head pressing portion 160b (see FIG. 18) of the recording head cartridge 101 in the state wherein the recording head cartridge 101 is set on the carriage 40, and biases the recording head cartridge 101 toward the cable terminal portion 103a by the spring force of the contact spring 123. Also, since the cable terminal portion 103a and the head guide 122 are arranged to oppose each other, the cable terminal portion 103a and the head terminal portion 153 can reliably contact with each other. The head guide 122 also serves as a guide upon attaching the recording head cartridge 101 on the carriage 40.

Figure 16:
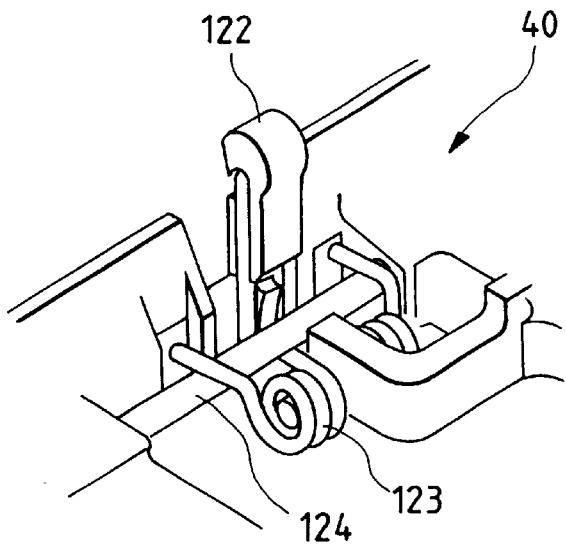
FIG. 16 is a perspective view of a portion in the vicinity of a head guide of the carriage shown in FIG. 15.

In this embodiment, as shown in FIG. 16, a double-torsion type twisted coil spring is used as the contact spring 123. Two coil portions of the spring are supported by a support rod integrally formed on the carriage 40, and end portions extending from the two coil portions sandwich a metal shaft member 124, the two ends of which are supported by the carriage 40. With this structure, when a load acts on the contact spring 123, the load acting on the carriage 40 is distributed, thus preventing deformation of the carriage 40. When the recording head cartridge 101 is attached to the carriage 40, the pressing force of the recording head cartridge 101 by the contact spring 123 is set to be about 2 kgf to assure contact between the cable terminal portion 103a and the head terminal portion 153.

As described above, since the cover portion 121a is formed on the cable press 121 and the head guide 122 is arranged at the position opposing the cable terminal portion 103a, when the recording head cartridge 101 is attached to the carriage 40, the surface of the recording head cartridge 101, that is on the head terminal portion 153 side, is inserted under the cover portion 121a, and the recording head cartridge 101 is rotated about the distal end portion of the cover portion 121a as a fulcrum. For this reason, the cover portion 121a serves as a guide upon attaching the recording head cartridge 101, and the recording head cartridge 101 can be attached within a small space.

The recording head cartridge 101 has a shape that fits in the carriage 40 so as to increase the ink capacity of the ink tank to be stored therein. Accordingly, the shape itself provides a guide function. Upon insertion into the carriage 40, the recording head cartridge 101 is inserted so that the lower portion of its bottom surface is guided along the inner wall portion of the bottom surface of the carriage 40, thus allowing easy attachment.

Since the cover portion 121a overhangs above the cable terminal portion 103a, when the recording head cartridge 101 is attached without inserting the surface of the recording head cartridge 101, on the head terminal portion 153 side, below the cover portion 121a, a base plate 151 or the like of the recording head cartridge 101 contacts the cover plate 121a before it contacts the cable terminal portion 103a, thus preventing the recording head cartridge 101 from damaging the cable terminal portion 103a.

Figure 17:
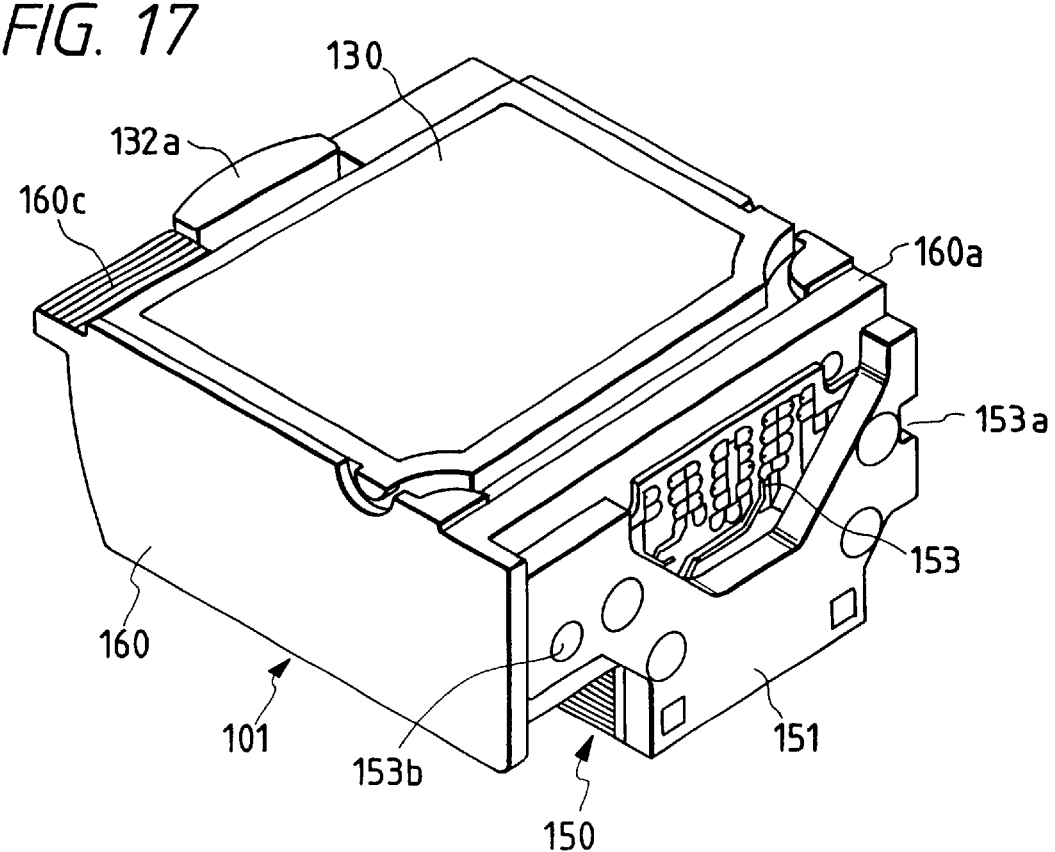
FIG. 17 is a perspective view of a monochrome recording head cartridge mounted on the ink-jet recording apparatus shown in FIG. 1 and having an ink tank attached when viewed from the direction in which the head terminal portion can be seen.

The recording head cartridge 101 will be described below. FIG. 17 is a perspective view showing the recording head cartridge 101 when viewed from the direction in which the head terminal portion 153 can be seen, and FIG. 18 is a perspective view showing the recording head cartridge 101 when viewed from the direction in which the surface opposite to the head terminal portion 153 can be seen.

Figure 18:
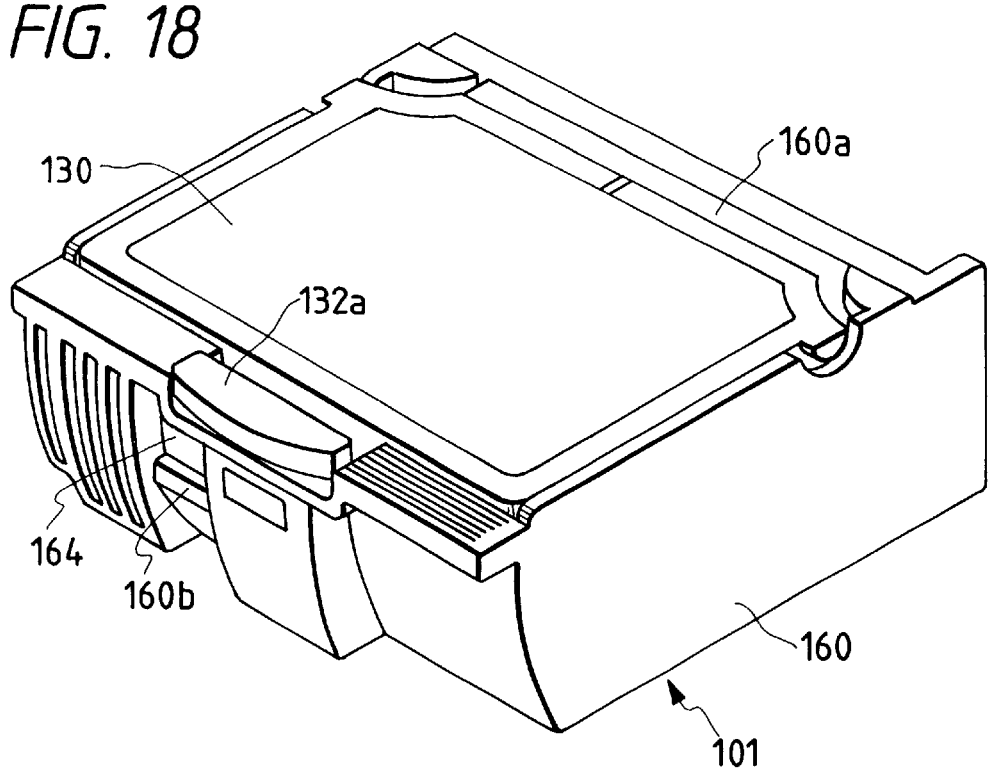
FIG. 18 is a perspective view of the monochrome recording head cartridge mounted on the ink-jet recording apparatus shown in FIG. 1 and having an ink tank attached when viewed from the direction the surface opposite to the direction in which the head terminal portion can be seen.

The recording head cartridge 101 is a monochrome cartridge, and integrates a nozzle portion for ejecting ink and a monochrome holder 160 having a box shape with an opening portion on the upper surface, as shown in FIGS. 17 and 18. An ink tank 130 that stores monochrome ink is detachably attached into the monochrome holder 160.

The head terminal portion 153 is an electrical board which s fixed to the base plate 151 and consists of, e.g., glass epoxy, and wiring lines connected to a plurality of electrothermal transducers that constitute the nozzle portion are connected to the head terminal portion 153 by wire bonding. The base plate 151 is attached to be inclined at 1 to 4° with respect to the feed direction of a recording medium P, and hence, an array of a plurality of ejection ports that constitute the nozzle portion is also inclined at 1 to 4° with respect to the feed direction of the recording medium P.

After ink is supplied from the ink tank 130 to a common ink chamber that constitutes the nozzle portion and is temporarily stored therein, it enters ink channels by the capillary phenomenon, forms a meniscus at each ejection port, and maintains the ink channels full of ink. At this time, when each electrothermal transducer is energized and generates heat on the basis of a recording signal supplied to the head terminal portion 153, the ink on the electrothermal transducer is abruptly heated and causes film boiling to produce a bubble in the corresponding ink channel, and expansion of the bubble ejects ink from the ejection port. As an energy generation element for generating energy, the electrothermal transducer has been exemplified. However, the present invention is not limited to such specific element, and a piezoelectric element for generating mechanical energy that can apply an ejection pressure instantaneously may be used.

The base plate 151 is formed with the head positioning notch 153a which receives the square head positioning projection 40d, and the head positioning hole 153b which receives the circular head positioning projection 40e, in correspondence with the positions of the head positioning projections 40d and 40e (see FIG. 15) of the carriage 40.

The base plate 151 is fixed to one end wall of the monochrome holder 160 by heat welding, ultrasonic welding, or the like. A stepped portion 160a is formed on an end portion, on the base plate 151 side, of the upper surface of the monochrome holder 160, and is lower by one step than the surrounding portion. Upon attaching the recording head cartridge 101 to the carriage 40, the upper surface of the stepped portion 160a is inserted under the cover portion 151a (see FIG. 15) of the cable press 121, thus easily roughly positioning the recording head cartridge 101.

As a mechanism for attaching/detaching the recording head cartridge 101 to/from the carriage 40, the head pressing portion 160b as a stationary portion held by the head guide 122 (see FIG. 15) of the carriage 40 upon attaching the cartridge 101 to the carriage 40, and a head attachment/detachment operation portion 160c as an operation portion for attaching/detaching the cartridge 101 to/from the carriage 40 are formed on the outer surface of the monochrome holder 160, on the side opposite to the base plate 151, i.e., on the other end wall side. The head pressing portion 160b is a recess portion which is formed aslant extending from the lower end of the surface of the monochrome holder 160, that is opposite to the base plate 151, to the upper end portion. The upper portion of the head pressing portion 160b is further recessed to serve as a head guide engaging portion 164. When the recording head cartridge 101 is set on the carriage 40, the head guide 122 of the carriage 40 engages with this head guide engaging portion 164. When the head guide 122 engages with the head guide engaging portion 163, the position of the recording head cartridge 101 is determined with respect to the carriage 40, and is fixed. The head attachment/detachment operation portion 160c is formed on the front side of the recording head cartridge 101, i.e., on the upper end portion of a region, farthest from the head pressing portion 160b, of the surface where the head pressing portion 160b is formed. When the recording head cartridge 101 is detached from the carriage 40, the operator holds the portion 160c with his or her finger and pulls it up, thus easily detaching the cartridge 101.

The head pressing portion 160b and the head attachment/detachment operation portion 160c are formed on a region which becomes a recessed portion relative to a projecting region formed by forming a latch lever guide groove 160h (see FIG. 21) serving as a guide of a latch lever 132a. With this structure, the limited capacity of the recording head cartridge 101 can be effectively used, and the stationary portion held by the head guide 122 of the carriage 40 and the operation portion used for attaching/detaching the cartridge 101 to/from the carriage 40 are obtained by a minimum space.

Attachment/detachment of the recording head cartridge 101 to/from the carriage 40 will be described below.

In the following description, the upstream side in the feed direction of the recording medium P will be referred to as a deep side, the corresponding surface will be referred to as a back surface, the downstream side will be referred to as a front side, and the corresponding surface will be referred to as a front surface.

Figure 19:
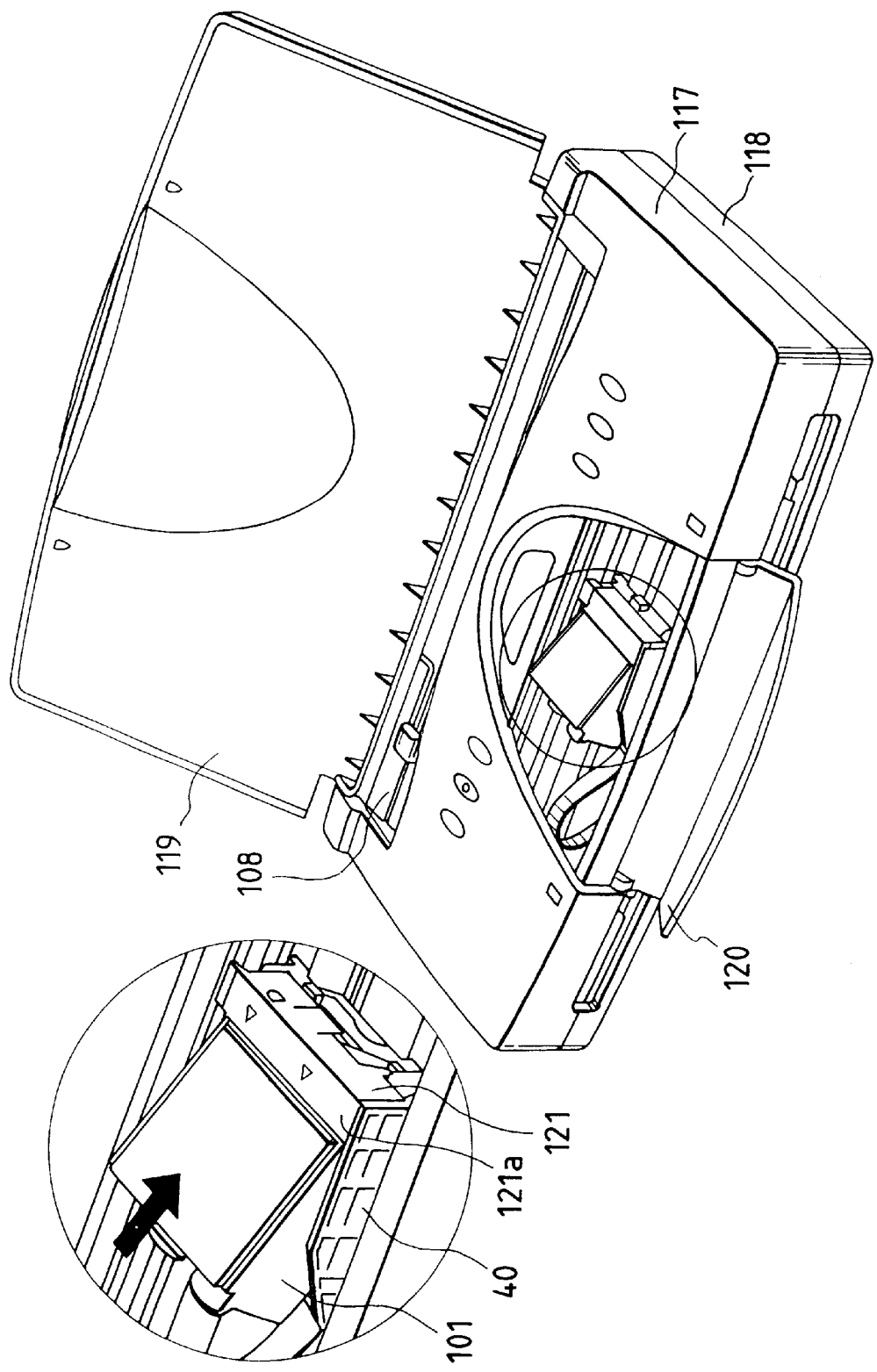
FIG. 19 is a perspective view showing the first step of the procedure for attaching the recording head cartridge on the carriage in the ink-jet recording apparatus shown in FIG. 2.

FIG. 19 is a perspective view showing the state wherein the ink-jet recording apparatus shown in FIG. 15 is housed in a housing. As shown in FIG. 19, upper and lower cases 117 and 118 constitute a casing, which stores the ink-jet recording apparatus shown in FIG. 15.

A top cover 119 that covers the upper case 117 is arranged on the deep-side portion of the upper case 117 to be free to open/close. The upper case 117 has an opening portion at a position corresponding to a pressure plate 108, and when the top cover 119 is opened, the top cover 119 serves as a tray for setting the recording medium P on the pressure plate 108. Furthermore, the upper case 117 has an opening portion extending from its central portion to the front surface, and the recording head cartridge 101 or the ink tank 130 can be attached/detached via this opening portion. For this reason, upon exchanging the recording head cartridge 101 or the ink tank 130, the carriage 40 is moved to the central portion of its moving range by a predetermined operation. A head cover 120 that covers a portion of the upper surface of this opening portion and the front surface is arranged on the front side of the opening portion via which the recording head 101 or the ink tank 130 is exchanged. When the recording head cartridge 101 or the ink tank 130 is not exchanged, the head cover 120 is closed to protect the recording head cartridge 101.

When the recording head cartridge 101 is attached to the carriage 40, the side of the recording head cartridge 101, which is provided with the base plate (see FIG. 17), is obliquely inserted in the direction of an arrow in FIG. 19 under the cover portion 121a of the cable press 121 provided to the carriage 40, as shown in FIG. 19. With this operation, the upright surface of the stepped portion 160a (see FIG. 17) of the recording head cartridge 101 contacts the end face of the cover portion 121a, thus roughly determining the position of the recording head cartridge 101.

Figure 20:
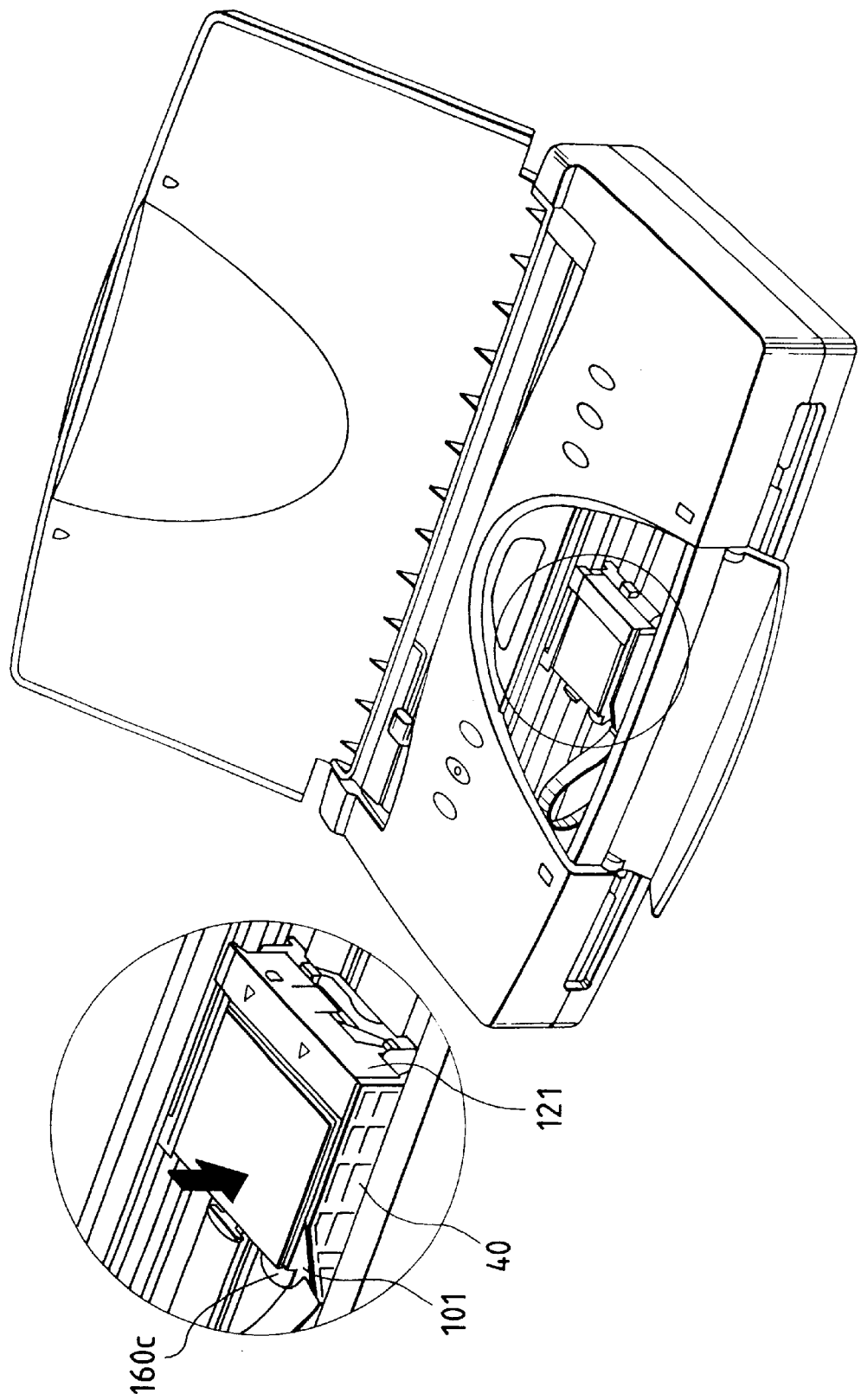
FIG. 20 is a perspective view showing the second step of the procedure for attaching the recording head cartridge on the carriage in the ink-jet recording apparatus shown in FIG. 2.

Subsequently, as shown in FIG. 20, the recording head cartridge 101 is pushed downward. At this time, the inclined surface of the head pressing portion 160b (see FIG. 18) of the recording head cartridge 101 is guided along the head guide 122 (see FIG. 15) of the carriage 40, and the head positioning projections 40d and 40e of the carriage 40 are respectively fitted into the head positioning notch 153a and the head positioning hole 153b of the recording head cartridge 101. In this manner, the recording head cartridge 101 is smoothly attached to the carriage 40. When the recording head cartridge 101 is completely attached, the head guide 122 engages with the head guide engaging portion 164 (see FIG. 18), and the recording head cartridge 101 is fixed. By the pressing force of the head guide 122, the head terminal portion 153 of the recording head cartridge 101 is pressed against the cable terminal portion 103a of the carriage 40, thus ensuring electrical connections therebetween.

When the recording head cartridge 101 is detached from the carriage 40, the head attachment/detachment operation portion 160c of the carriage 40 is pulled upward. With this operation, the head guide engaging portion 164 disengages from the head guide 122, and the head pressing portion 160b climbs on the head guide 122. When the head pressing portion 160b climbs on the head guide 122, the recording head cartridge 101 is set in an oblique state while its head attachment/detachment operation portion 160c side projects from the carriage 40. By holding the portion projecting from the carriage 40, the recording head cartridge 101 can be easily detached from the carriage 40.

On the surface where the head pressing portion 160b is formed, since the head attachment/detachment operation portion 160c is formed at the position farthest from the head pressing portion 160b, the moment that acts when the head guide engaging portion 164 disengages from the head guide 122 upon pulling up the head attachment/detachment operation portion 160c becomes large. With this moment, the recording head cartridge 101 can be detached by a small force, and easy attachment/detachment can be assured while securely holding the recording head cartridge 101. In order to further reduce the force required for detaching the recording head cartridge 101, the head pressing portion 160b is arranged on the deep side, and the head attachment/detachment operation portion 160c is arranged on the end portion on the front side with respect to the central line of the recording head cartridge 101, that is parallel to the moving direction of the carriage 40.

Figure 21:
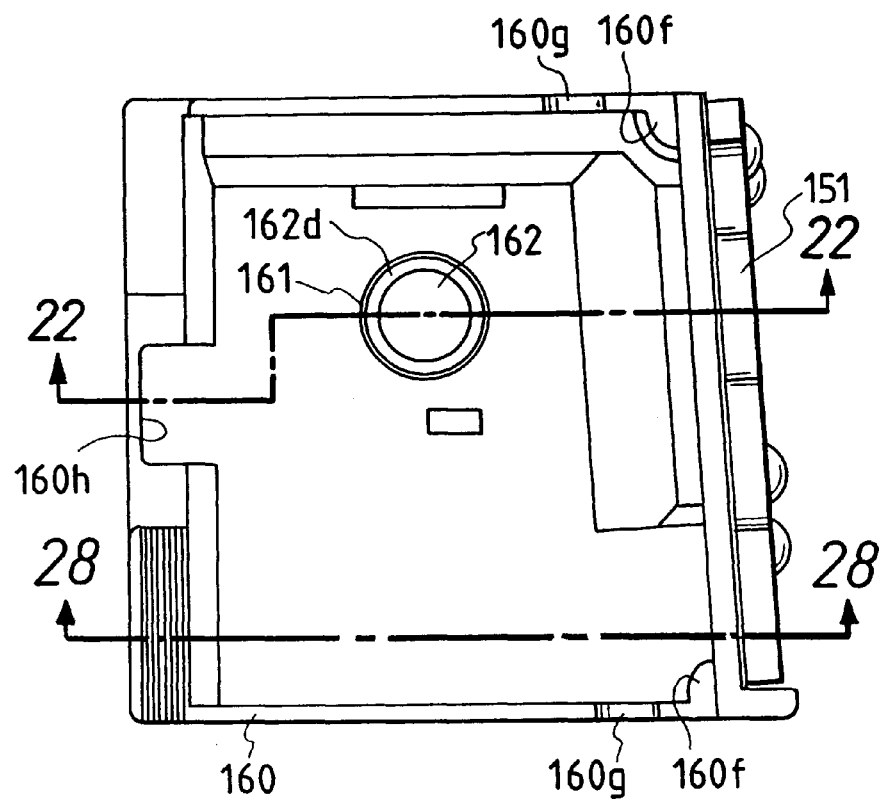
FIG. 21 is a plan view of the recording head cartridge shown in FIG. 17.
Figure 22:
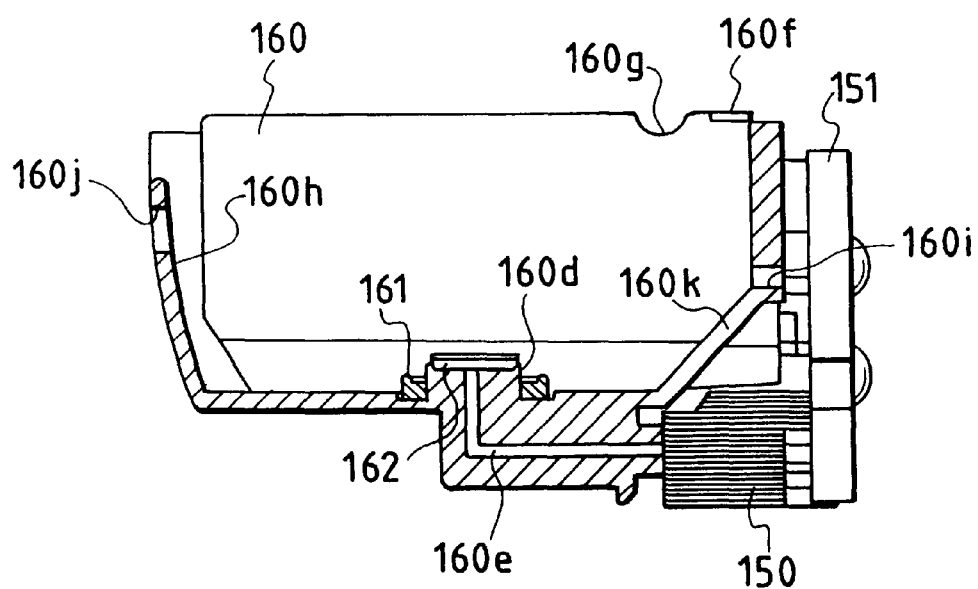
FIG. 22 is a sectional view of the recording head cartridge shown in FIG. 21 taken along a line 22—22.

FIG. 21 is a plan view of the recording head cartridge 101 shown in FIG. 17, and FIG. 22 is a sectional view of the recording head cartridge 101 taken along a line 22—22 in FIG. 21. As shown in FIGS. 21 and 22, an ink feed pipe 160d protrudes from the bottom surface of the monochrome holder 160, and an ink path 160e open to the ink feed pipe 160d communicates with a common ink chamber 150c (see FIG. 15) of a nozzle portion 150. A seal ring 161 consisting of an elastic member such as rubber is fixed around the ink feed pipe 160d. A filter 162 is attached to the open end of the ink feed pipe 160d to prevent the nozzle portion 150 from receiving foreign matter.

Bulged portions 160f are formed at two corner portions of the upper end portion of the monochrome holder 160, that is on the base plate 151 side, and tank projection guide portions 160g as semi-circular recessed portions are formed in the vicinity of the portions 160f. The latch lever guide groove 160h serves as a guide of the latch lever 132a (to be described later; see FIGS. 17 and 18) upon attaching the ink tank 130 (see FIGS. 17 and 18), and is formed on the inner wall of the monochrome holder 160, on the side opposite to the base plate 151. Furthermore, an inclined surface 160k is formed on the ridge portion where the bottom wall and the wall on the base plate 151 side of the monochrome holder 160 cross.

Figure 23:
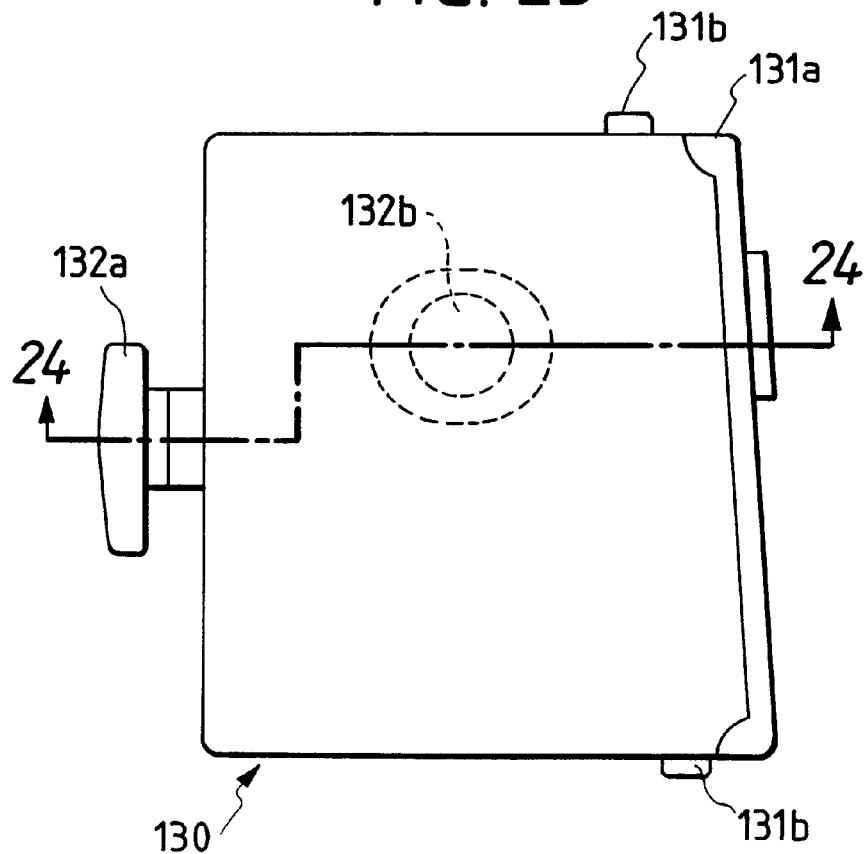
FIG. 23 is a plan view of the ink tank to be attached to the recording head cartridge shown in FIG. 17.
Figure 24:
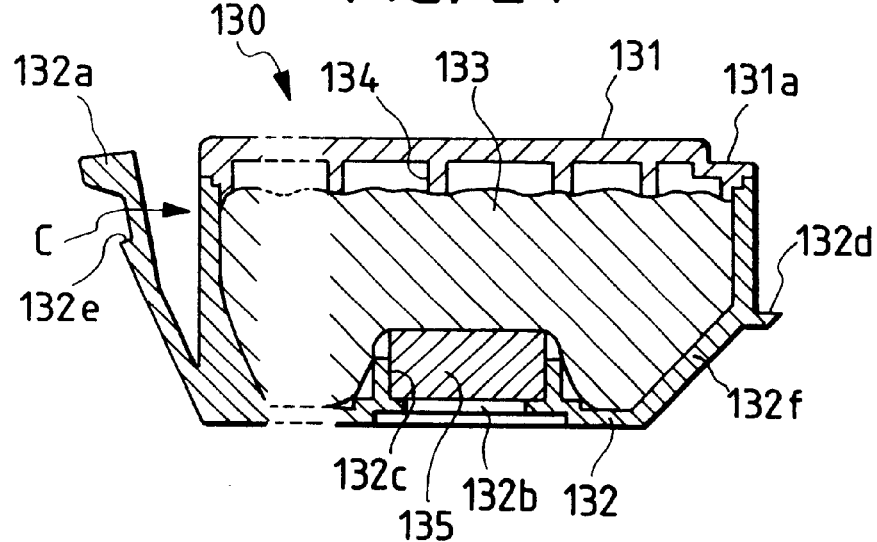
FIG. 24 is a sectional view of the ink tank shown in FIG. 23 taken along a line 24—24.

The ink tank 130 to be set in the recording head cartridge 101 will be described below. FIG. 23 is a plan view of the ink tank 130 to be set in the recording head cartridge 101 shown in FIG. 17, and FIG. 24 is a sectional view of the ink tank 130 taken along a line 24—24 in FIG. 23.

The ink tank 130 has a container 132 for holding ink, and a lid member 131 which covers the container 132 to provide a seal, and is formed with an air communication port (not shown).

An ink supply port 132b that receives the ink feed pipe 160d (see FIG. 22) of the monochrome holder 160 is formed on the bottom portion of the container 132, and a cylindrical support portion 132c stands upright around the port 132b. Before the ink tank 130 is set in the monochrome holder 160, the ink supply port 132b is sealed by a seal member (not shown) to prevent ink leakage.

Figure 25:
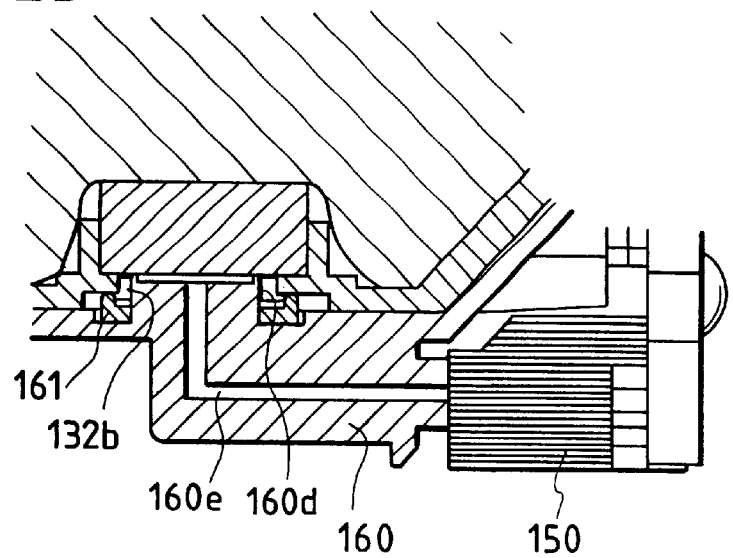
FIG. 25 is a sectional view showing the coupled state between an ink supply port of the ink tank shown in FIG. 24, and a monochrome holder.

The container 132 houses an ink absorber 133 consisting of, e.g., sponge, and ink is held while being absorbed by the ink absorber 133. An ink supply member 135 made up by a bundle of unidirectional fibers is inserted into and supported by the support portion 132c, and the ink absorber 133 is in tight contact with the upper end face of the ink supply member 135. The ink absorbed in the ink absorber 133 flows to the ink supply port 132b via the ink supply member 135. When the ink tank 130 is set in the monochrome holder 160, the ink feed pipe 160d of the monochrome holder 160 is inserted into the ink supply port 132b as shown in FIG. 25 and they communicate with each other, thus supplying the ink to the nozzle portion 150 via the ink path 160d. At this time, the seal ring 161 arranged around the ink supply port 132b is in tight contact with the outer edge portion of the ink supply port 132b, thus suppressing ink leakage.

In order to communicate the ink supply port 132b with the above-mentioned air communication port via the an air layer, ribs 134 (FIG. 24 illustrates the ribs 134 on the lid member 131 alone) are formed at predetermined positions inside the container 132 and the lid member 131, so as to form a predetermined space between the ink absorber and the container 132 or the lid member 131, and a slit (not shown) that communicates the interior and exterior of the container 132 with each other is formed on a portion of the inner surface of the support portion 132c. Since the interior and exterior of the ink tank 130 communicate with each other via the air layer in this manner, the ink can be prevented from spouting out or leaking from the ink supply port 132b upon removing the seal member that seals the ink supply port 132b. Even when the ambient temperature of the ink tank 130 rises during execution of recording, the ink in the ink tank 130 can be prevented from being pushed outside the tank. Furthermore, since the ink can be prevented from staying on the inner wall of the container 132, the ink never leak from the ink supply port 132b or the air communication port, thus improving the consumption efficiency of the ink.

On the other hand, as the external structure of the ink tank 130, the container 132 integrally has a lock pawl 132d as a pawl-shaped projection on the surface that contacts the inner wall, on the base plate 151 side, of the monochrome holder 160 when the ink tank 130 is set in the monochrome holder 160. The lock pawl 132d engages with a tank lock hole 160i (see FIG. 22) formed on the monochrome holder 160. The lock pawl 132d serves as a guide upon setting the ink tank 130 in the monochrome holder 160, and also has a role of holding the ink tank 130 when the ink tank 130 is set in the monochrome holder 160.

On the ridge portion of the container 132, where the bottom wall and the surface formed with the lock pawl 132d cross, an inclined surface 132f is formed. The angle and shape of the inclined surface 132f are nearly equal to those of the inclined surface 160k (see FIG. 22) of the monochrome holder 160.

Furthermore, on the other end face as the outer wall on the side opposite to the lock pawl 132d, a latch lever 132a, the lower end of which is elastically supported, is integrally formed. The latch lever 132a is inclined upward outside the ink tank 130, and engages with the latch lever guide groove 160h (see FIGS. 21 and 22) of the monochrome holder 160. When the ink tank 130 is set in the monochrome holder 160, the latch lever 132a is pressed by the latch lever guide groove 160h and flexes in the direction of an arrow C shown in FIG. 24, so that a latch pawl 132e formed on the latch lever 132a engages with a latch pawl engaging hole 160j formed on the latch lever guide 160h. In this embodiment, the latch lever 132a is integrally formed on the container 132.

A stepped portion 131a lower by one step than the upper surface of the lid member 131 is formed on the end portion of the upper surface of the member 131, that is on the side the lock pawl 132*d* is formed. When the ink tank 130 is set in the monochrome holder 160, it is inserted so that the stepped portion 131*a* is inserted under the bulged portions 160*f* (see FIGS. 21 and 22) of the monochrome holder 160, thus roughly determining the position of the ink tank 130. Also, tank projections 131*b* are formed on the lid member 131 and are fitted in the tank projection guide portions 160*g* of the monochrome holder 160.

Attachment/detachment of the ink tank 130 to/from the monochrome holder 160 will be explained below.

Figure 26:
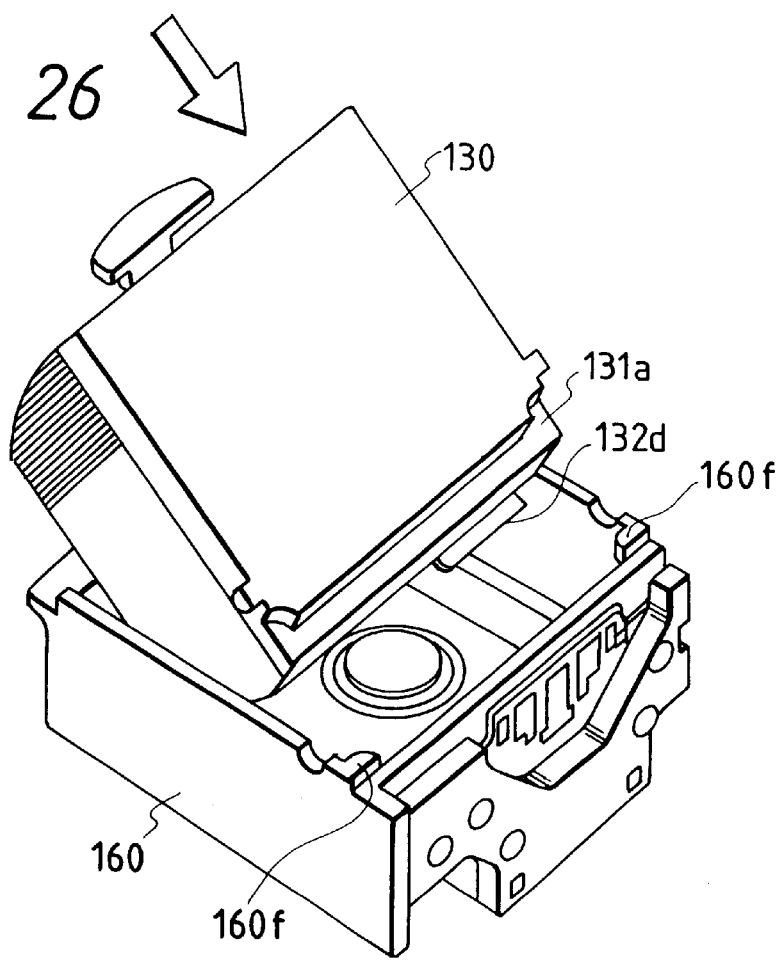
FIG. 26 is a perspective view showing the first step of the procedure for attaching the ink tank on the recording head cartridge.

Upon attaching the ink tank 130 to the monochrome holder 160, the seal member that seals the ink supply port 132*b* is removed. Thereafter, as shown in FIG. 26, the ink tank 130 is obliquely inserted in the direction of an arrow in FIG. 26 from the formation side of the lock pawl 132*d* to insert the stepped portion 131*a* of the ink tank 130 under the bulged portions 160*f* of the monochrome holder 160 and to hook the lock pawl 132*d* of the ink tank 130 to the tank lock hole 160*i* (see FIG. 22) of the monochrome holder 160, thus roughly determining the position of the ink tank 130. Upon inserting the ink tank 130 into the monochrome holder 160, since the inclined surface 132*f* is formed on the ink tank 130, the ink tank 130 is inserted using the inclined surface 132*f* as a guide so that if the inclined surface 132*f* becomes nearly parallel to the bottom wall of the monochrome holder 160, it is easy to insert the stepped portion 131*a* of the ink tank 130 under the bulged portions 160*f* of the monochrome holder 160. Also, since the monochrome holder 160 and the ink tank 130 are formed with the corresponding inclined surfaces 160*k* and 132*f*, another type of ink tank cannot be set in this monochrome holder 160, thus preventing setting errors of the ink tanks.

Figure 27:
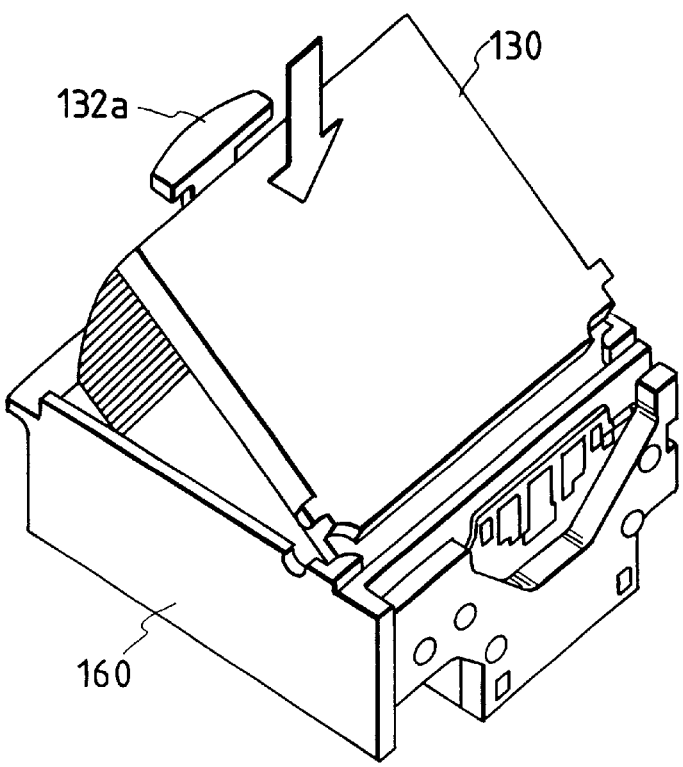
FIG. 27 is a perspective view showing the second step of the procedure for attaching the ink tank on the recording head cartridge.

Subsequently, as shown in FIG. 27, the ink tank 130 is pushed downward so that the latch lever 132*a* moves along a latch lever guide groove 160*h* (see FIGS. 21 and 22). Then, the ink tank 130 substantially pivots about the portion inserted into the monochrome holder 160, the latch lever 132*a* is pressed by the latch lever guide groove 160*h* and pushed thereinto while flexing inwardly, and the latch pawl 132*e* (see FIG. 24) of the latch lever 132*a* engages with the latch pawl engaging hole 160*j* (see FIG. 22) of the monochrome holder 160. In this manner, the ink tank 130 is fixed to the monochrome holder 160. Since the latch pawl 132*e* clicks into the latch pawl engaging hole 160*j* upon engagement, the user is assured of safe attachment.

When the ink tank 130 is detached from the monochrome holder 160, the latch lever 132*a* is pressed inwardly to disengage the latch pawl 132*e* from the latch pawl engaging hole 160*j*. Since the latch lever 132*a* is elastically supported at its lower end portion and is inclined upward outside the ink tank 130, its inclination is to recover the state shown in FIG. 24 upon disengagement of the latch pawl 132*e* from the latch pawl hole 160*j*. As a result, the proximal inclined surface of the latch lever 132*a* slidably moves upward along the latch lever guide groove 160*h*, and the latch lever 132*a* side of the ink tank 130 pops up automatically, thus setting the ink tank 130 in the oblique state. By holding the pop-up portion, the ink tank 130 can be easily detached from the monochrome holder 160.

In this manner, when the ink tank 130 is attached/detached to/from the monochrome holder 160 by substantially pivoting it, attachment/detachment can be attained within a small space. Upon attachment, the insertion direction of the ink tank 130 into the monochrome holder 160 is limited when the stepped portion 131*a* is inserted under the bulged portions 160*f* of the monochrome holder 160 while using the inclined surface 132*f* of the ink tank 130 as a guide. Furthermore, since the tank projections 131*b* are formed on the ink tank 130, and the tank projection guide portions 160*g* are formed on the monochrome holder 160, the insertion position of the ink tank 130 into the monochrome holder 160 is also limited, and the ink tank 130 pivots nearly about the tank projections 131*b*.

With this operation, the ink tank 130 can be set in the monochrome holder 160 without interfering with the filter 162 (see FIGS. 21 and 22), and the filter 162 can be prevented from the damage upon attaching the ink tank 130. Also, since the ink tank 130 is attached/detached by pivoting it with respect to the monochrome holder 160, the attachment/detachment space can be reduced and, hence, the ink-jet recording apparatus can be made compact.

Figure 28:
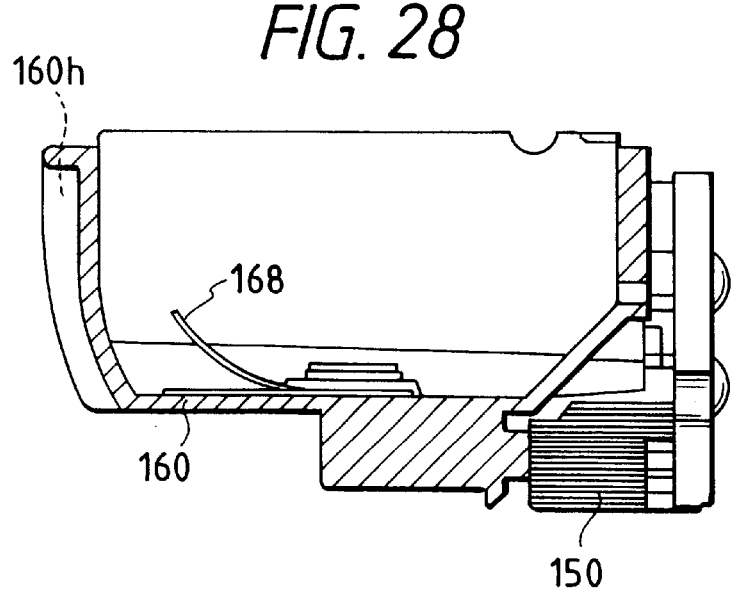
FIG. 28 is a sectional view of the recording head cartridge shown in FIG. 21 taken along a line 28—28 in an example of the recording head cartridge in which a popup string is arranged on the bottom wall of the monochrome holder.

In the above-mentioned example, in order to detach the ink tank 130 from the monochrome holder 160, lifting of the end portion, on the latch lever 132*a* side, of the ink tank 130 by the recovery force of the latch lever 132*a* is used. In addition, a pop-up spring 168 may be arranged as a biasing means for biasing the bottom wall, on the other end side (the side the latch lever 132*a* is formed), of the ink tank 130 toward the opening of the monochrome holder 160, as shown in FIG. 28, and the end portion, on the latch lever 132*a* side, of the ink tank 130 may be popped up using the spring force. The pop-up spring 168 is a leaf spring fixed to the bottom wall of the hollow portion of the monochrome holder 160, and its free end portion extends upward from the nozzle portion 150 side toward the latch lever guide groove 160*h* side of the monochrome holder 160 while being curved. With this spring, when the latch pawl 132*e* disengages from the latch pawl engaging hole 160*j*, the end portion, on the latch lever 132*a* side, of the ink tank 130, is popped up by the spring force of the pop-up spring 168, and the protruding amount of the ink tank 130 from the monochrome holder 160 becomes large, thus making detachment of the ink tank 130 easier.

FIGS. 26 and 27 show the attachment/detachment procedures of the ink tank 130 to the recording head cartridge 101 alone. Of course, even when the recording head cartridge 101 is set in the carriage 40 (see FIG. 15), the ink tank 130 can be attached/detached.

Figure 29:
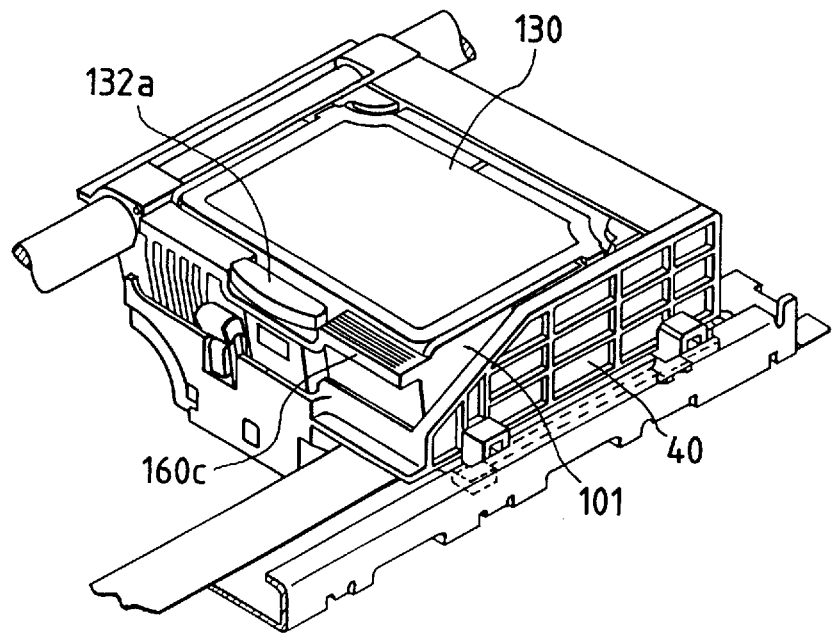
FIG. 29 is a perspective view showing the state wherein the recording head cartridge shown in FIG. 18 is attached to the carriage shown in FIG. 15.

FIG. 29 is a perspective view showing the state wherein the ink tank 130 is set in the recording head cartridge 101, and the recording head cartridge 101 is set in the carriage 40. As can be seen from FIG. 29, the latch lever 132*a* serving as an operation portion upon attaching/detaching the ink tank 130, and the head attachment/detachment operation portion 160*c* serving as an operation portion upon attaching/detaching the recording head cartridge 101 are arranged on the same side with respect to the moving direction of the carriage 40. With this arrangement, the operator can easily recognize these operation portions, and can attach/detach them by similar operations, thus improving the operability. In addition, the operation portions with integrated design can be provided. Furthermore, upon attaching/detaching the ink tank 130 or the recording head cartridge 101, since an operation space for the operator need be assured on only the side of the latch lever 132*a* and the head attachment/detachment operation portion 160*c*, the operator can attach/detach the ink tank 130 or the recording head cartridge 101 at an arbitrary position as long as the carriage 40 is located at a position that can assure such space.

Although the latch lever 132*a* and the head attachment/detachment operation portion 160*c* are arranged adjacent to each other, the ink tank 130 is detached by the operation for pressing the latch lever 132a inwardly, and the recording head cartridge 101 is detached by the operation for pulling up the head attachment/detachment operation portion 160c, thus avoiding operation errors by means of different operation methods. Since the latch lever 132a and the head attachment/detachment operation portion 160c are arranged at different levels, the operator can easily recognize their different functions. In this case, since the ink tank 130 is attached/detached more frequently than the recording head cartridge 101, the head portion (hooked with the finger of the operator) of the latch lever 132a is arranged above the position of the head attachment/detachment operation portion 160c in consideration of an easy operation of the lever 132a.

Figure 30:
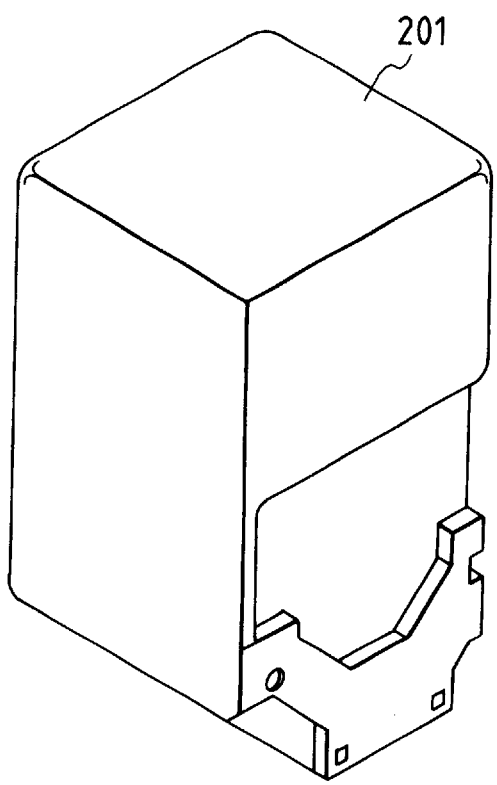
FIG. 30 is a perspective view showing a recording head cartridge 201 having a shape different from that of a recording head cartridge 101 described with reference to FIGS. 15 to 29.

FIG. 30 is a perspective view showing a recording head cartridge 201 having a shape different from that of the recording head cartridge 101 described above with reference to FIGS. 15 to 29. The recording head cartridge 201 can store a large amount of ink used in a large-scale recording apparatus.

The scanner head cartridge of this embodiment shown in FIGS. 1 to 8, 9A, 9B, 9C, 10 to 13 can be mounted on either of different ink-jet printers which use the recording head cartridges 101 and 201.

More specifically, as for the compact recording head cartridge 101, the scanner head cartridge can be mounted on the carriage 40 that mounts the recording head cartridge in the same manner as the recording head cartridge 101. On the other hand, as for the recording head cartridge 201 with a larger capacity, the scanner head cartridge is combined with an adapter (to be described later) to have the same shape as the recording head cartridge 201, and can be mounted on a carriage that mounts the recording head cartridge 201.

The mounting compatibility of the scanner head cartridge 10 with the recording head cartridge 101 will be explained below.

Figure 31:
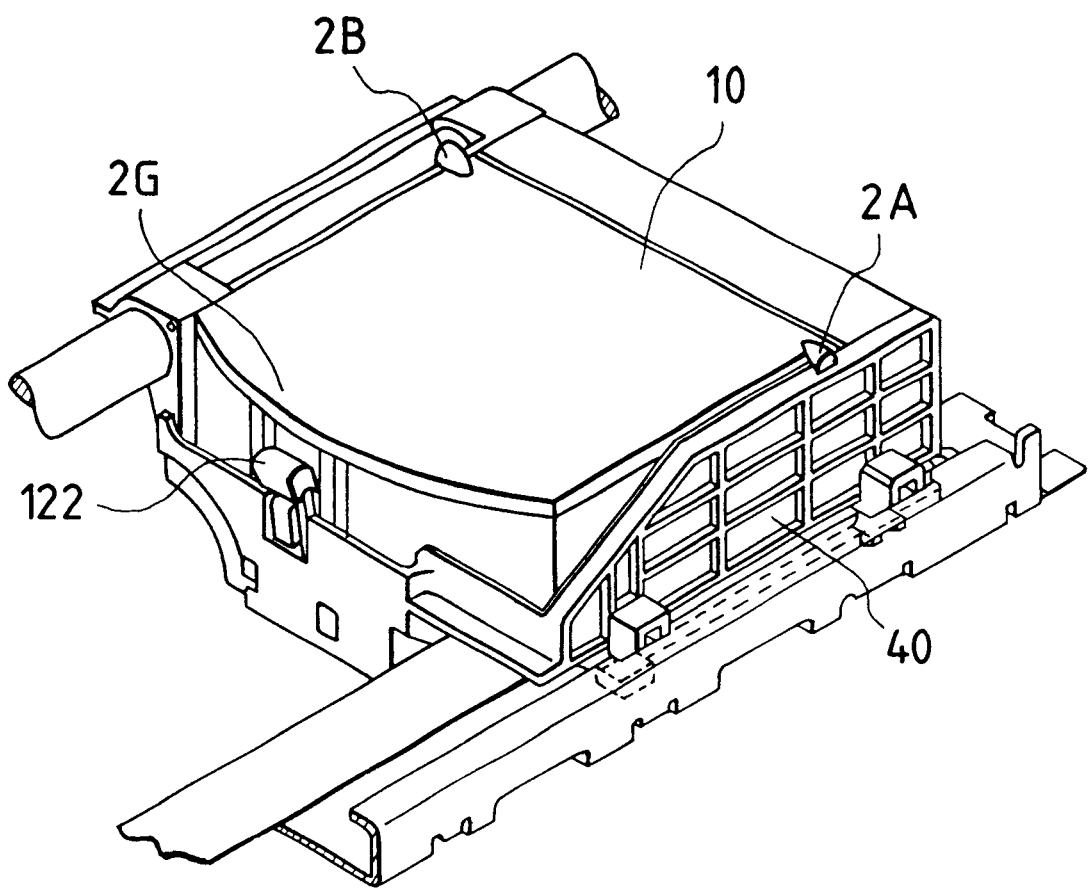
FIG. 31 is a perspective view showing the state wherein a scanner head cartridge 10 is mounted on a carriage 40 shown in FIG. 29 in place of the recording head cartridge 101.

FIG. 31 is a perspective view showing the state wherein the scanner head cartridge 10 is mounted on the carriage 40 shown in FIG. 29 in place of the recording head cartridge 101.

As described above, the recording head cartridge 101 has a shape that fits in the carriage 40 for the purpose of increasing the ink storage amount of the ink tank, and serves as a guide function upon insertion.

Since the scanner head cartridge 10 must have the same shape as that of the recording head cartridge 201, the shape of its bottom portion (a surface facing the recording paper sheet) is the same as that of the bottom surface portion of the recording head cartridge 201. For this reason, the scanner head cartridge 10 is inserted into the carriage 40 so that its lugs 2A and 2B as positioning guide means move along the upper edges of the side walls of the carriage 40, thus assuring easy insertion.

Accurate positioning upon insertion is attained in the same manner as for the recording head cartridge 101 by the two head positioning projections 40d and 40e formed on the carriage 40, the positioning hole 1B, and the positioning groove 1C.

The attached state shown in FIG. 31 will be explained below. The scanner head cartridge 10 is pressed against the contact portion by the head guide 122, thus reliably coupling and storing the scanner head cartridge 10 to and into the carriage 40.

At this time, a portion pressed by the head guide 122 corresponds to a recess portion 2E (see FIG. 4) formed on the projection 2F projecting from the upper case 2. For this reason, the projection 2F is pressed toward the projection 3D, and the indentation 2D and the projection 3D can fit each other more firmly, thus integrating the upper and lower cases 2 and 1 more securely.

The scanner head cartridge 10 is detached from the cartridge 40 by lifting up the eave portion 2G. Before the scanner head cartridge 10 is detached from the carriage 40, since the projection 2F is pressed by the head guide 122, the cartridge 10 is detached while the upper and lower cases 2 and 1 are integrated, thus warranting easy operation.

A portion of the scanner head cartridge 10, which contacts the head guide 122 initially when it is inserted into the carriage 40, i.e., a portion where the lower case 1 that receives the pressing force of the head guide 122 to the end is contiguous with the projection 2F formed on the upper case 2 upon detaching the scanner head cartridge 10 from the carriage 40, has a contiguous curved surface shape, so that the pressing force of the head guide 122 gradually increases upon attachment and gradually decreases upon detachment, so as to allow easy attachment/detachment.

The arrangement and mounting of an adapter, which allows the scanner head cartridge 10 to have the same shape as that of the recording head cartridge 201 shown in FIG. 30 will be described below with reference to FIGS. 32A and 32B.

As shown in FIGS. 32A and 32B, the upper case 2 is removed from the scanner head cartridge 10, and the lower case 1 alone is used.

Hinge portions (not shown) of an adapter 225 fit in the rotation holes 1S (see FIG. 2) of the lower case 1, as shown in FIGS. 32A and 32B, and the projection 3D shown in FIG. 3 fits in an indentation (not shown) in a projection that projects from the end portion on the side opposite to the hinge portions, thus building a scanner head cartridge 226 which has the same shape as that of the recording head cartridge 201 shown in FIG. 30 and integrates the upper and lower portions.

In the above description, the engaging portions of the lower case 1 and the adapter 225 have the same shapes as those of the upper and lower cases 2 and 1. However, the present invention is not limited to such specific shapes as long as the shape of the engaging portion does not disturb attachment when the scanner head cartridge 226 is attached to the printer, and other engaging methods may be used. Therefore, since scanner head cartridges with different shapes are built using an adapter, a new head cartridge need not be entirely manufactured, and a great cost reduction can be attained. In addition, a single base unit can be used by a plurality of types of printers. Also, the scanner head cartridge and the recording head cartridge may use identical upper cases.

With this arrangement, even carriages which carry different cartridges and have different shapes can be commonly used using a common base unit, thus attaining a cost reduction.

Since attachment/detachment to/from the carriage and opening/closing of the upper case are easy, the optical system can be easily and quickly adjusted.

Many widely different embodiments of the present invention may be constructed without departing from the spirit and scope of the present invention. It should be understood that the present invention is not limited to the specific embodiments described in the specificaiton, except as defined in the appended claims.

What is claimed is:

1. A scanner head cartridge that can be held on a carriage of an information processing apparatus, said scanner head cartridge comprising:
 a lower case containing therein a plurality of light sources which are arranged in line, each emitting a respective different color of light, a diffusion member which diffuses light from the plurality of light sources to reduce illumination nonuniformity in the arrangement direction of the light sources, and a lens which condenses the light which goes through said diffusion member to illuminate an original;
 an upper case structured to be coupled with said lower case to cover an open face of said lower case; and
 guide members formed at opposite ends of said upper case in said arrangement direction, which guide said scanner head cartridge to a set predetermined position on said carriage.

2. A scanner head cartridge according to claim 1, wherein said lower case is coupled with said upper case in a vicinity of one side of the open face of said lower case, and further comprising a coupler arranged on a side opposite to the one side of said upper case and said lower case being coupled.

3. A scanner head cartridge according to claim 1, further comprising a coupler arranged to couple, said coupler comprising a first coupling member protruding from an edge portion of said upper case, and a second coupling member arranged on said lower case corresponding to said first coupling member, wherein said coupler is arranged at a position such that a holder of said carriage presses said first coupling member to said second coupling member when mounted on said carriage.

4. A scanner head cartridge according to claim 1, wherein said lower case contains optical parts required for reading which comprise the light sources arranged to enable the illuminating light thereof to irradiate a source document diagonally, and at the same time, to enable a center of irradiation thereof to irradiate a position in a depth direction deeper than a reference position of a height of the source document.

5. A scanner head cartridge according to claim 4, further comprising a cooling plate and a base board, wherein said cooling plate is provided for a reverse side of said base board, and wherein said light sources are installed on said base board in order to stabilize a temperature thereof.

6. A scanner head cartridge according to claim 5, wherein a low electric current flows in said scanner head cartridge for a specific period of time to effect preheating before reading, and a low electric current flows after reading in order to maintain a given temperature.

7. A scanner head cartridge according to claim 1, wherein said carriage has a pressing member, and wherein said scanner head cartridge is guided by said guide members and then fixed by being pressed by said pressing member of said carriage, when said scanner head cartridge is attached to said carriage, and wherein a portion of said scanner head cartridge, at which portion said scanner head cartridge is in contact with said pressing member, has a continuous curved surface so that a pressing force of said pressing member increases gradually when said scanner head cartridge is attached to said carriage, and decreases gradually when detached from said carriage.

8. An information processing apparatus comprising a carriage capable of holding a scanner head cartridge, and a driving unit which moves said carriage in said information processing apparatus, wherein said scanner head cartridge comprises:
 a lower case containing therein a plurality of light sources which are arranged in a line, each emitting a respective different color of light, a diffusion member which diffuses light from the plurality of light sources to reduce illumination nonuniformity in the arrangement direction of the light sources, and a lens which condenses the light which goes through said diffusion member to illuminate an original;
 an upper case structured to be coupled with said lower case to cover an open face of said lower case; and
 guide members formed at opposite ends of said upper case in said arrangement direction, which guide said scanner head cartridge to a set predetermined position on said carriage.

9. An information processing apparatus according to claim 8, wherein said lower case is coupled with said upper case in a vicinity of one side of the open face of said lower case, and further comprising a coupler arranged on a side opposite to the one side of said upper case and said lower case being coupled.

10. An information processing apparatus according to claim 8, further comprising a coupler, arranged to couple, said coupler comprising a first coupling member protruding from an edge portion of said upper case, and a second coupling member arranged on said lower case corresponding to said first coupling member, and said coupler being arranged at such a position that a holder of said carriage presses said first coupling member when mounted on said carriage.

11. An information processing apparatus according to claim 8, wherein said lower case contains optical parts required for reading which comprise the light sources arranged to enable the illuminating light thereof to irradiate a source document diagonally, and at the same time, to enable a center of irradiation thereof to irradiate a position in a depth direction deeper than a reference position of a height of the source document.

12. An information processing apparatus according to claim 11, further comprising a cooling plate and a base board, wherein said cooling plate is provided for a reverse side of said base board, and wherein said light sources are installed on said base board in order to stabilize a temperature thereof.

13. An information processing apparatus according to claim 12, wherein a low electric current flows in said scanner head cartridge for a specific period of time to effect preheating before reading, and a lower electric current flows after reading in order to maintain a given temperature.

14. An information processing apparatus according to claim 8, wherein said carriage can hold exchangeably with said scanner head cartridge, an ink head cartridge for recording on a recording medium, and said ink head cartridge is provided with an ink jet head to discharge ink from ink discharge ports to record on the recording medium.

15. An information processing apparatus according to claim 14, wherein said ink head cartridge is provided with electrothermal transducing elements, and at the same time, provided with an ink jet head to record on the recording medium by discharging ink from ink discharge ports by use of thermal energy generated by said electrothermal transducing elements.

16. An information processing apparatus according to claim 14, wherein said ink head cartridge is provided with piezoelectric elements, and at the same time, provided with an ink jet head to record on the recording medium by discharging ink from ink discharge ports by use of mechanical energy generated by said piezoelectric elements.

17. A scanner head cartridge according to claim 8, wherein said carriage has a pressing member, and wherein said scanner head cartridge is guided by said guide members and then fixed by being pressed by said pressing member of said carriage, when said scanner head cartridge is attached to said carriage, and wherein a portion of said scanner head cartridge, at which portion said scanner head cartridge is in contact with said pressing member, has a continuous curved surface so that a pressing force of said pressing member increases gradually when said scanner head cartridge is attached to said carriage, and decreases gradually when detached from said carriage.

18. A scanner head cartridge according to claim 8, wherein a radiation plate is arranged on a rear surface of a board which carries the light sources so as to stabilize a temperature of the light sources.

* * * * *